US011755205B2

(12) United States Patent
Belgundi et al.

(10) Patent No.: US 11,755,205 B2
(45) Date of Patent: Sep. 12, 2023

(54) STORAGE SPACE RECLAMATION FOR TRANSIENT STREAMING DATA

(71) Applicant: EMC IP Holding Company LLC, Hopkinton, MA (US)

(72) Inventors: Prajakta Belgundi, Bangalore (IN); Shivesh Ranjan, Navi Mumbai (IN); Flavio Paiva Junqueira, Barcelona (ES)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 5 days.

(21) Appl. No.: 17/501,756

(22) Filed: Oct. 14, 2021

(65) Prior Publication Data

US 2023/0121887 A1   Apr. 20, 2023

(51) Int. Cl.
  *G06F 3/00*  (2006.01)
  *G06F 3/06*  (2006.01)
(52) U.S. Cl.
  CPC .......... *G06F 3/0608* (2013.01); *G06F 3/0629* (2013.01); *G06F 3/0673* (2013.01)

(58) Field of Classification Search
  None
  See application file for complete search history.

(56) References Cited

U.S. PATENT DOCUMENTS

2022/0317915 A1* 10/2022 Danilov ................ G06F 3/0673

* cited by examiner

*Primary Examiner* — Midys Rojas
(74) *Attorney, Agent, or Firm* — Amin, Turocy & Watson, LLP

(57) ABSTRACT

Facilitation of reclaiming of storage space is enabled relative to one or more data streams employing the storage space. A system can comprise a processor, and a memory that stores computer executable instructions that, when executed by the processor, facilitate performance of operations. The operations can comprise determining posting or non-posting of one or more specified cut positions from readers of events thus far appended to a stream of a stream storage system. The operations can further comprise, in response to the one or more specified cut positions being posted, truncating the stream based on the specified cut positions of the stream, and, in response to no specified cut positions being posted, truncating the stream based on a time limit or a space limit relative to a respective time quantity or a respective space quantity of the stream.

20 Claims, 17 Drawing Sheets

1000

```
┌──────────┐
│ Decision │
│   414    │
└────┬─────┘
     ▼
```

If the subscriber lower bound is greater than the determined maximum limit, truncating at a specified stream cut downstream of the subscriber lower bound that is also downstream-most of the maximum limit determined 416C Deleting the specified stream cuts from an associated lookup table 1004

FIG. 10

STORAGE SPACE RECLAMATION FOR TRANSIENT STREAMING DATA

BACKGROUND

Data streams can be loaded, posted and/or otherwise provided to an application, server and/or other architecture for being used and/or ingested by one or more end users. A computer-based system can be employed to facilitate maintenance of the data streams.

SUMMARY

The following presents a simplified summary of the disclosed subject matter to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can comprise a processor and a memory that stores computer executable instructions that, when executed by the processor, facilitate performance of operations. The operations can comprise determining posting or non-posting of one or more specified cut positions from readers of events thus far appended to a stream of a stream storage system. The operations can further comprise, in response to the one or more specified cut positions being posted relative to the stream, truncating the stream based on the specified cut positions of the stream. The operations can further comprise, in response to no specified cut positions being posted relative to the stream, truncating the stream based on a time limit or a space limit relative to a respective time quantity or a respective space quantity of the stream.

An example method can comprise, determining posting or non-posting of one or more specified cut positions from readers of events thus far appended to a stream of a stream storage system. The method can further comprise, in response to the one or more specified cut positions being posted relative to the stream, truncating the stream based on the specified cut positions of the stream, while adhering to one or more lower or upper quantity limits of the stream. The method can further comprise, in response to no specified cut positions being posted relative to the stream, truncating the stream according only to the one or more lower or upper quantity limits of the stream.

An example non-transitory machine-readable medium can comprise instructions that, when executed by a processor, can facilitate performance of operations. These operations can comprise truncating a stream of a stream storage system where one or more specified cut positions from one or more readers of events appended to the stream thus far are identified relative to the stream, and where a subscriber lower bound is identified from the one or more specified cut positions. The truncating can comprise determining, regarding the subscriber lower bound, whether truncating the stream at the subscriber lower bound leaves a quantity, within a determined threshold range of the stream storage system, of the stream.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 10 illustrates an example process flow that can facilitate a process to reclaim storage space relative to one or more data streams employing the storage space, comprising a consumption-based process, in accordance with one or more embodiments described herein;

DETAILED DESCRIPTION

Overview

Figure 1:
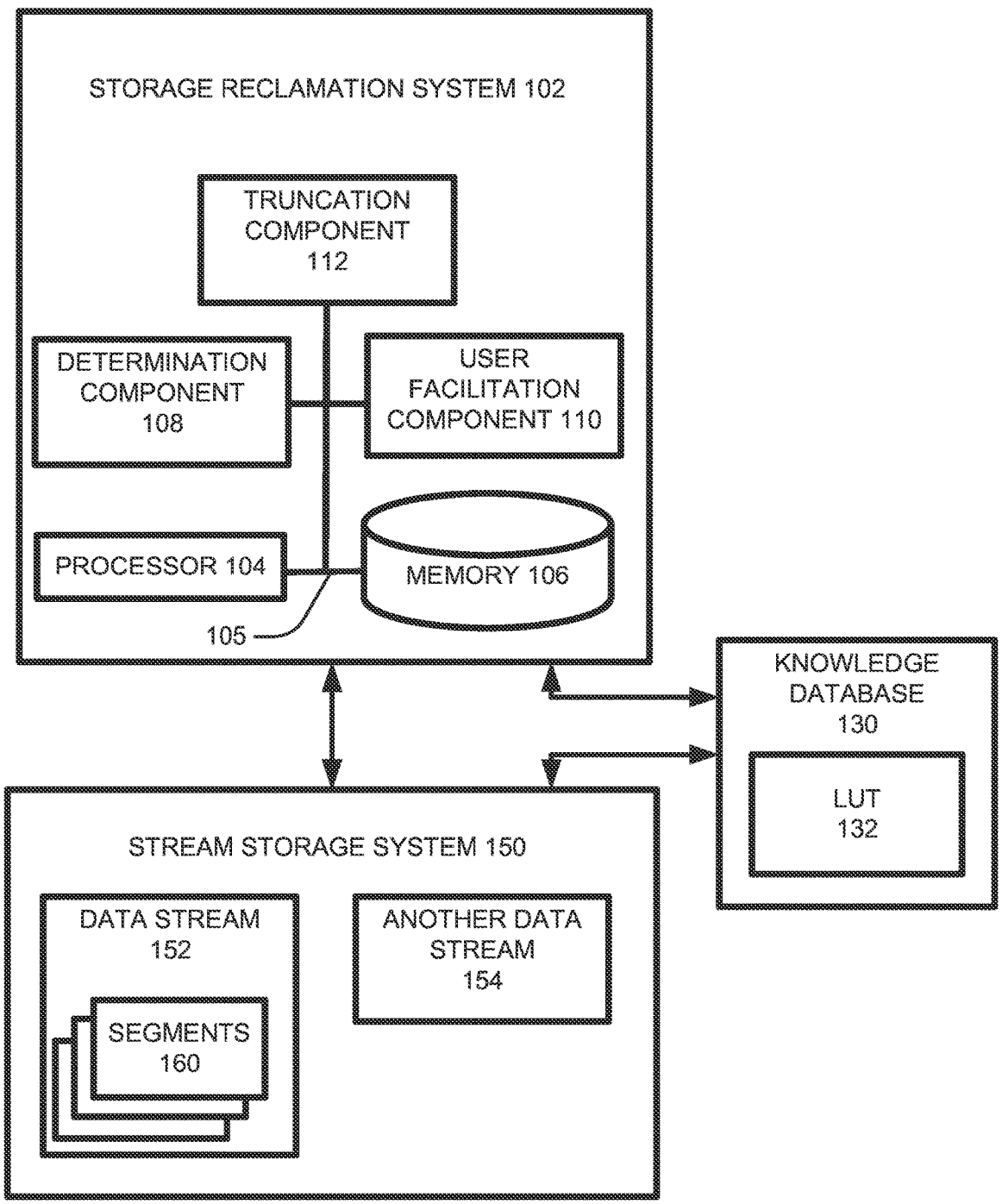
FIG. 1 illustrates an example system architecture that can facilitate a process to reclaim storage space relative to one or more data streams employing the storage space, in accordance with one or more embodiments described herein.

A data stream can comprise generated data that can be continuously generated. The data can be appended in clusters, such as events. That is, events can be appended to segments of a data stream, where segments are the unit of storage of the data stream. The continuously generated data can be unbounded. Sources of data written, posted and/or otherwise appended to streams can include online shopping applications, social networks, IoT sensors, video cameras, drones, autonomous vehicles, radar and/or various other applications, software, machines and/or other entities. The data from the streams, and thus from the various events appended to the streams can be consumed, such as ingested, read, analyzed and/or otherwise employed in various ways, including reacting to recent events to analyzing historical stream data.

Although data streams are typically unbounded, truncating them can be desirable in practical scenarios to bound the amount of storage space the data of a stream uses relative to a stream storage system. This can particularly be the case where, as in practical real-world situations, storage capacity is limited. Another reason for truncating data streams can be regulatory compliance, which often can dictate an amount of time an application can retain data. Storage space and time are consequently both relevant when determining a retention policy for streaming data.

Indeed, a stream storage system can comprise one or more retention policies and/or algorithms based on one or more quantity limits and/or thresholds. Such quantity can be measured in time, such as time for which an event has been appended at the stream. The time axis can be based upon units of the data as initially recorded and/or based on time in storage, among other measurements. Additionally, and/or alternatively, such quantity can be measured based on the amount of space occupied by a respective stream at a respective storage system.

An issue with such retention policies, limits and/or thresholds based on one or more quantities of time and/or storage space can be that such quantities do not account for actual use of the stored data streams. Indeed, a data stream can be stored for a purpose—that is, to be used, analyzed, edited, reviewed and/or otherwise employed. Absent accounting for actual consumption of a data stream by one or more users, reclamation of data stream storage space, and thus deletion and/or other truncation of data streams can adversely affect processes employed by such one or more users. Data can be truncated from a stream before a user has initially used the data and/or before a user has completing consuming of the data. Conversely, data can be retained longer than is useful to one or more users. Furthermore, different users can consume at different rates and/or different users can dynamically change individual consumption rate. Thus, even a truncation system accounting for user data consumption also should account for use of the same data by plural users.

In general, techniques provided by one or more embodiments of systems, methods and/or non-transitory machine-readable mediums herein can address one or more of the aforementioned problems, issues, concerns and/or deficiencies. For example, one or more embodiments described herein can provide a system and/or method for receiving, storing and using user-submitted checkpoints relative to a lengthy data stream, such as comprising one or more specified cut positions relative to the stream. The checkpoints can be supplied based on consumption by a user of a data stream and/or by a group of one or more users of the data stream. The checkpoints can be employed to truncate the data stream relative to one or more rates of consumption by one or more users.

Furthermore, existing techniques of truncation according to time of storage and/or storage space occupied can be maintained as supplementary processes and/or can be employed as limits in addition to one or more truncation techniques based on consumption. In one or more embodiments, truncation according to consumption can be accomplished without acknowledgement by the one or more systems, computer-implemented methods and/or non-transitory machine-readable mediums of individual ones of events comprised by a stream.

Example Architecture

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 1700 illustrated at FIG. 17. In one or more described embodiments, computer and/or computing-based elements can be used in connection with implementing one or more of the systems, devices, components and/or computer-implemented operations shown and/or described in connection with FIG. 1 and/or with other figures described herein.

Turning first to FIG. 1, an example of an architecture is illustrated, with \ description being provided below. While referring here to one or more processes, facilitations and/or uses of the non-limiting system architecture 100, it will be appreciated that description provided herein, both above and below, also can be relevant to one or more other non-limiting systems described herein.

Illustrated at FIG. 1 is an example non-limiting system architecture 100 that can facilitate a process to reclaim storage space relative to one or more data streams employing the storage space. The non-limiting system architecture 100 can be employed for truncating a stream at a stream storage system based on a plurality of rules, user-approved policies and/or algorithms. That is, truncation can be based on a measurable quantity of time or storage space, based on consumption of the data stream by one or more users, and/or based on any combination thereof. A time quantity can be based on time of storage (e.g., time being stored at the stream storage system), time of writing or initial generalization, and/or actual time along which the data stream progresses, such as in the case of video, audio and/or the like.

As illustrated at FIG. 1, the non-limiting system architecture 100 can comprise a stream storage system 150. The stream storage system 150, as illustrated, can comprise any suitable type of component, machine, device, facility, apparatus and/or instrument that comprises a processor and/or can be capable of effective and/or operative communication with a wired and/or wireless network. All such embodiments are envisioned. For example, stream storage system 150 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the storage reclamation system 102 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

In particular, stream storage system 150 can comprise any suitable memory, machine-readable memory and/or the like for storing one or more data streams, such as the data stream 152 and another data stream 154. Although not shown, the stream storage system can comprise a suitable processor, bus and/or one or more other components.

It will be appreciated that although the stream storage system 150 is illustrated as external to the storage reclamation system 102, in one or more embodiments, the stream storage system 150 can be comprised by the storage reclamation system 102.

A data stream, such as the data stream 152, can include data, metadata and/or the like that is stored to the stream storage system 150 by any suitable method. As used herein, a data stream also can be referred to as a stream. A single stream, such as the data stream 152, can be comprised of a plurality of segments 160, which each can comprise one or more events.

Figure 2:
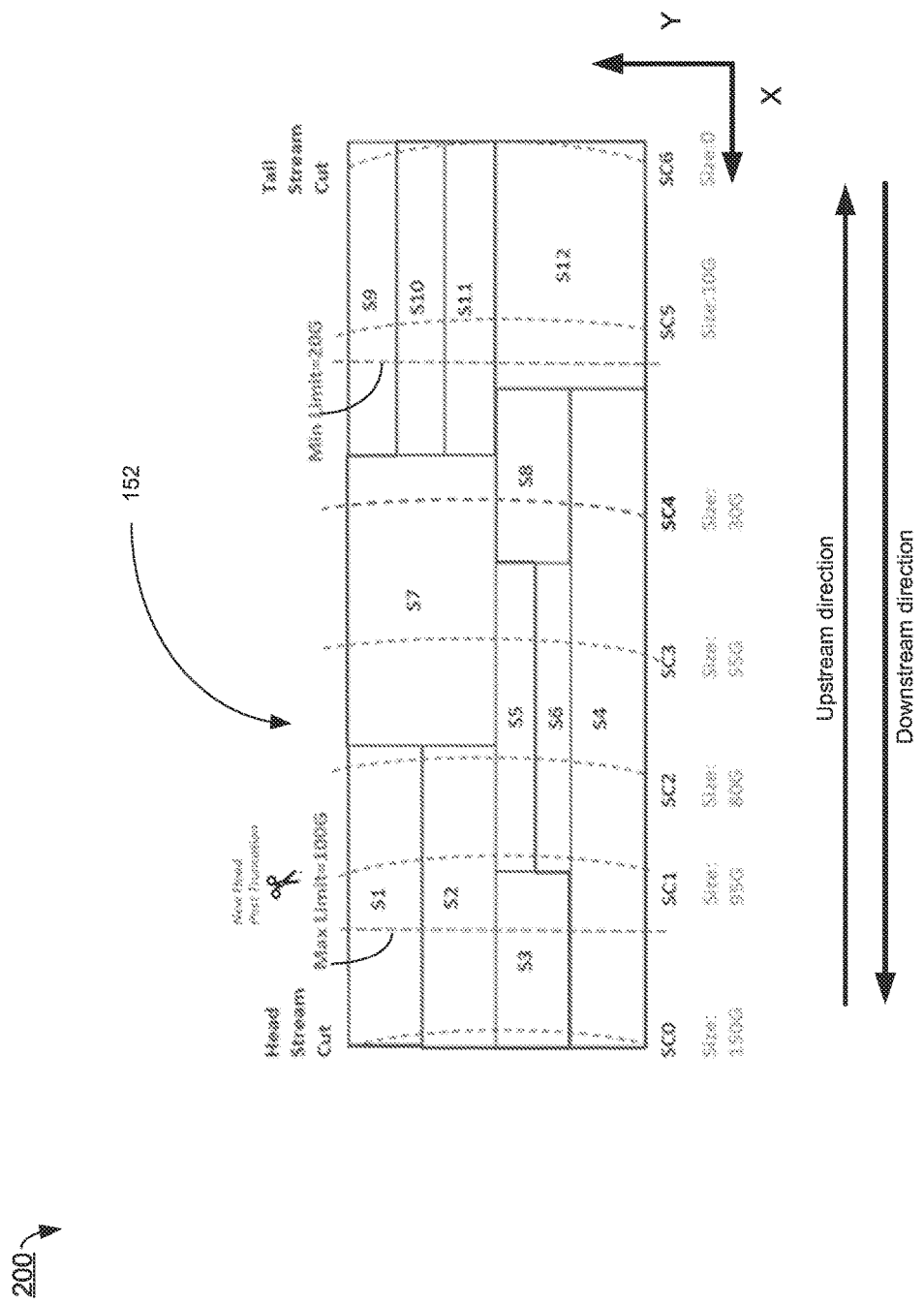
FIG. 2 illustrates another example system architecture that can facilitate a process to reclaim storage space relative to one or more data streams employing the storage space, in accordance with one or more embodiments described herein.

Turning briefly to FIG. 2, a data stream diagram 200 illustrates that one or more segments S1-S12, each having one or more events, can be stored along the data stream 152 in parallel to one another and/or in succession to one another. That is, one or more events of S1-S12 can have data occurring in parallel, or having occurred in parallel, such as events of S1-S4. Further, one or more events can sequentially follow one or more other events, such as having data that occurs after one or more other events or has occurred after data from one or more other events. For example, events of S5 and S6 are downstream to events of S3, and thus events of S5 and S6 are sequentially after events of S3 at the data stream 152. Likewise, events of S3 are upstream to events of S5 and S6 along the stream 152.

Indeed, as shown at FIG. 2, the number of segments for appending and/or truncating can vary over a respective unit axis of the data stream 152. It will be appreciated that the data stream 152 can be represented relative to a time axis. That is, data, and/or events, can be written to and/or appended to a stream continuously, such as in a sequence or order. Likewise, such data can be reviewed and/or analyzed by a user (consumer) in a sequence or order. That is, as described herein, the data stream 152 can be arranged based upon a predecessor-successor order along the data stream 152.

In one or more embodiments, the stream storage system 150 can serialize events when writing the events to a data stream and can deserialize events when allowing for reading of the stream by a user. That is, the stream storage system 150 can employ a serializer implementation or an external reference such as a schema registry. An entity appending one or more events to a stream can provide a routing key in association with the event. In such case, the routing key, such as a hash thereof, can be employed by the storage system 150 to determine which segment written to the data stream thus far to append a new event relative to. In this way, even in view of stream scaling, users can read and/or otherwise consume events following a per key order.

As used herein, an "entity" can refer to a machine, device, smart device, component, hardware, software and/or human.

Regarding scaling, in one or more embodiments a number of segments 160 of a stream can be changed due to scaling. Scaling can cause an existing segment, stored at the data storage system thus far, to be split into plural segments. Scaling can cause multiple existing segments to be merged into a new single segment. Likewise, scaling can cause an existing event, stored at the data storage system thus far, to be split into plural events. Scaling also can cause multiple existing events to be merged into a new single event.

Turning again to FIG. 1, one or more descriptions will now be presented to provide a better understanding of one or more processes of the stream storage system 150 and/or the storage reclamation system 102.

Stream users (also herein referred to as user entities, readers and/or reader entities) can generate one or more checkpoints relative to a stream. A checkpoint can be a named set of offsets for one or more stream events that an application (e.g., analysis application, use application, reading application and/or the like) can use to resume from. Although not shown at FIG. 1, it will be appreciated that a device employed by a user entity can comprise such application and also one or more components for enabling communication with the stream storage system 150 and/or storage reclamation system 102. One or more checkpoints can be employed by an application to mark a position in the stream at which to roll back to at a future reading session. In the case of stateful applications, such stream checkpoints can be coordinated with checkpoints of the application itself.

Checkpoints can be built upon, and thus can comprise, one or more fundamental primitives such as stream cuts. A stream cut can mark a position at a stream. In a checkpoint, the stream cut can provide the position information for the stream. It will be appreciated that a stream cut can be provided separate from a checkpoint. It also will be appreciated that a stream cut often is not written directly to a data stream, but rather is employed to reference one or more points along a data stream. A stream cut can comprise any suitable type of data or metadata, such as text, binary or other representation.

In one or more embodiments, stream cuts can be stored in a knowledge database, such as the knowledge database 130. Storing can include any one or more of uploading, downloading, posting, writing, generating and/or the like. The knowledge database 130 can be communicatively coupled to the stream storage system 150 and to the storage reclamation system 102. Stream cuts can be stored to the knowledge database 130, such as to a lookup table (LUT) 132 at the knowledge database 130 vie employing the storage reclamation system 102 (such as the user facilitation component 110) and/or by the stream storage system 150.

In an LUT 132, stream cuts can be stored based on any suitable ordering, such as being filtered according to time. Stream cuts can comprise a name, such as SC1, that corresponds to a location along a data stream. Referring briefly again to FIG. 2, it will be appreciated that a stream cut, such as SC1 can represent a location at a plurality of segments of a data stream that are written parallelly along a data stream. For example, SC1 represents a location that cuts across segments S1, S2, S5, S6 and S4. That is, a stream cut can represent a location across a whole extent (at FIG. 2 represented as the Y-axis) of a data stream.

It further will be appreciated that a stream cut can be other than linear relative to an X-axis of a data stream, such as a time axis of the data stream 152 representing the predecessor-successor order of appending of segments S1-S12. For example, the curved shape can represent that a stream cut can be assigned relative to locations at segments that are unrelated to one another along a respective time axis.

Additionally, relative to the data stream 152 at FIG. 2, additional terms will now be defined. First, at FIG. 2, the segments Sn are illustrated with n being 1 through 12. A low number n indicates a segment location generally closer to a stream head. A high number n indicates a segment location generally closer to a stream tail.

A stream head refers to the smallest offsets of events that have no predecessor. Such events have no predecessor either because such events are the first events written to a stream or their predecessors have been truncated. Likewise, tail refers to the highest offsets of events of an open stream that has no successor (e.g., the most recently written events and/or last events along the X-axis after a truncation).

Downstream refers to a direction along a data stream from tail end to head end. At FIG. 2, a downstream-most end (most preceding end) is the leftmost end of the data stream 152. A stream cut that is downstream relative to another point on a stream is a stream that precedes the another point on the stream.

Upstream refers to a direction along a data stream from head end to tail end. At FIG. 2, an upstream-most end (most succeeding end) is the rightmost end of the data stream 152. A stream cut that is upstream relative to another point on a stream is a stream that succeeds the another point on the stream.

As will be appreciated in connection with description provided below, provision of checkpoints and stream cuts can be facilitated by the storage reclamation system 102. That is the storage reclamation system 102 can serve as a controller for data, e.g., data streams, stored at the stream storage system 150.

As illustrated at FIG. 1, the non-limiting system architecture 100 also can comprise a storage reclamation system 102. The storage reclamation system 102, as illustrated, can comprise any suitable type of component, machine, device, facility, apparatus and/or instrument that comprises a processor and/or can be capable of effective and/or operative communication with a wired and/or wireless network. All such embodiments are envisioned. For example, storage reclamation system 102 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the storage reclamation system 102 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

In one or more embodiments, the storage reclamation system 102 can be associated with, such as accessible via, a cloud computing environment. In one or more embodiments, the storage reclamation system 102 can function in cooperation with and/or as part of another operating environment, such as the operating environment 1700 illustrated at FIG. 17.

It will be appreciated that operation of the non-limiting system architecture 100 and/or of the storage reclamation system 102 is not limited to facilitating a single truncation of a data stream or even truncation of a single data stream. Rather, operation of the non-limiting system architecture 100 and/or of the storage reclamation system 102 can be scalable. For example, the non-limiting system architecture 100 and/or the storage reclamation system 102 can facilitate a process to execute two or more truncations in parallel at a single data stream. Likewise, the non-limiting system architecture 100 and/or the storage reclamation system 102 can facilitate one or more truncations of one or more data streams in parallel.

The storage reclamation system 102 can comprise one or more components, such as a memory 106, processor 104, bus 105, determination component 108, user facilitation component 110 and/or truncation component 112. Generally, storage reclamation system 102 can facilitate a process to truncate a data stream and thus reclaim storage space from truncated portions of the data stream. It will be appreciated that although particular one or more functions are described below as being performed by certain of the one or more components of the storage reclamation system 102, it will be appreciated that in one or more other embodiments, one or more processes performed by one or more of the components can be performed by one or more others of the components.

One or more communications between one or more components of the non-limiting system architecture 100, and/or between an entity facilitating provision of a specified stream cut and the non-limiting system architecture 100, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 104, memory 106 and bus 105 of the storage reclamation system 102.

For example, in one or more embodiments, storage reclamation system 102 can comprise a processor 104 (e.g., computer processing unit, microprocessor, classical processor, quantum processor and/or like processor). In one or more embodiments, a component associated with storage reclamation system 102, as described herein with or without reference to the one or more figures of the one or more embodiments, can comprise one or more computer and/or machine readable, writable and/or executable components and/or instructions that can be executed by processor 104 to facilitate performance of one or more processes defined by such component(s) and/or instruction(s). In one or more embodiments, the processor 104 can comprise the determination component 108, user facilitation component 110 and/or truncation component 112.

In one or more embodiments, the storage reclamation system 102 can comprise a machine-readable memory 106 that can be operably connected to the processor 104. The memory 106 can store computer-executable instructions that, upon execution by the processor 104, can cause the processor 104 and/or one or more other components of the storage reclamation system 102 (e.g., determination component 108, user facilitation component 110 and/or truncation component 112) to perform one or more actions. In one or more embodiments, the memory 106 can store computer-executable components (e.g., determination component 108, user facilitation component 110 and/or truncation component 112).

Storage reclamation system 102 and/or a component thereof as described herein, can be communicatively, electrically, operatively, optically and/or otherwise coupled to one another via a bus 105 to perform functions of non-limiting system architecture 100, storage reclamation system 102 and/or one or more components thereof and/or coupled therewith. Bus 105 can comprise one or more of a memory bus, memory controller, peripheral bus, external bus, local bus, quantum bus and/or another type of bus that can employ one or more bus architectures. One or more of these examples of bus 105 can be employed to implement one or more embodiments described herein.

In one or more embodiments, storage reclamation system 102 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the non-limiting system architecture 100 can reside in the cloud, and/or can reside locally in a local computing environment (e.g., at a specified location(s)).

In addition to the processor 104 and/or memory 106 described above, storage reclamation system 102 can comprise one or more computer and/or machine readable, writable and/or executable components and/or instructions that, when executed by processor 104, can facilitate performance of one or more operations defined by such component(s) and/or instruction(s).

Turning now to one or more operations of the storage reclamation system 102, the determination component 108 can be employed to receive, obtain, upload, download and/or otherwise identify a specified stream cut from a user entity relative to a data stream 152. The user entity can be one that consumes the data stream 152 and/or a controlling entity of one or more users of the data stream 152. A specified stream cut (e.g., a stream cut provided by a user entity) can be provided in any suitable format to any of the stream storage system 150, storage reclamation system 102 and/or knowledge database 130. In one or more embodiments, the specified stream cut can be received by the storage reclamation system 102, such as by a component and/or aspect of the storage reclamation system 102, such as the memory 106, a mail component and/or a download component, other than the determination component 108.

The user facilitation component 110 can provide various functions, such as (i) facilitating receipt and/or generation of one or more checkpoints and/or specified stream cuts, (ii) providing for setting of one or more selectively determined thresholds and/or ranges relative to data at a data stream, (iii) setting one or more retention policies for the data streams, and/or (iv) corresponding with the truncation component 112 to implement retention, appending and/or truncating of a data stream according to one or more other functions of the user facilitation component.

That is, as mentioned above relative to receipt of a specified stream cut, the user facilitation component 110 can receive and/or search for one or more specified stream cuts. The user facilitation component 110 can thus write and/or otherwise enter the specified stream cuts relative to the LUT 132 at the knowledge database 130, for example.

The user facilitation component 110 can provide for the setting of one or more selectively determined thresholds and/or ranges relative to data at a data stream. The provision can be digital and/or physical, such as employing a user interface, such as a graphical user interface or application programming interface. The user facilitation component 110 can allow for selection of, and store, maximum and minimum limits (e.g., upper quantity and lower quantity limits, respectively) for one or more quantities relative to a data stream, such as time in storage and storage space. The user facilitation component 110 can allow for individual limits to be set by individual reader entities, individual reader entities of a group of individual reader entities, and/or for a controlling entity, such as setting limits relative to one or more reader entities of a group. For example, one or more selections, limits and/or thresholds can be transmitted to the storage reclamation system 102, where the user facilitation component 110 can write the one or more selections, limits and/or thresholds to a database, such as to the LUT 132 of the knowledge database 130 relative to respective ones of user entities from which the one or more selections, limits and/or thresholds were received.

It also will be appreciated that the user facilitation component 110 can store, such as via a lookup table, data regarding what reader entities are part of a reader group, and thus subject to the limits and/or retention policies of such reader group.

The user facilitation component 110 also can store, such as via a lookup table, data regarding which reader entities are subscriber entities (e.g., readers that submit stream cuts) and which reader entities are non-subscriber entities (e.g., readers that do not submit stream cuts). That is, relative to a single reader group, the group can comprise both readers that submit stream cuts and readers that do not submit stream cuts. That is, a data stream can have associated with it both readers that submit stream cuts and readers that do not submit stream cuts. Whether the storage reclamation system 102 executes truncation according to time/space limits and/or according to limits also including consumption-based limits (e.g., specified stream cuts) can be guided and/or controlled relative to one or more selective approvals and/or acknowledgments of such selections, limits and/or thresholds. All possible combinations are envisioned.

Figure 3:
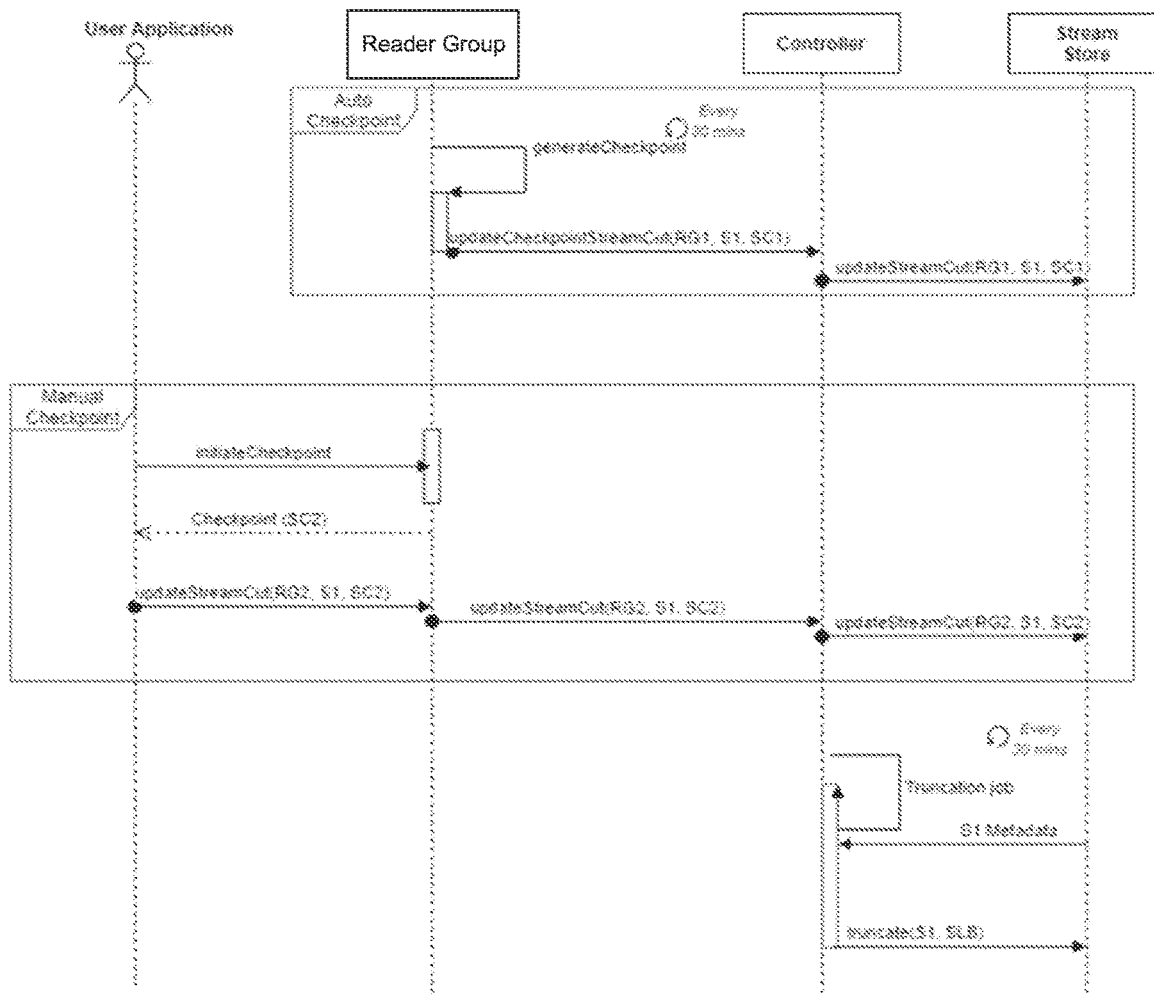
FIG. 3 illustrates an exemplary process diagram of a stream being maintained by the example system architecture of FIG. 1, in accordance with one or more embodiments described herein.

In addition, the user facilitation component 110 can store, such as via a lookup table, data regarding what subscriber entities (e.g., readers that submit stream cuts) automatically submit/publish stream cuts and/or manually submit/publish stream cuts. Turning now to FIG. 3, a flow diagram 300 is illustrated relative to provision of checkpoints and/or stream cuts by a user entity. At FIG. 3, RG1 and RG2 are different subscriber reader groups reading from and/or otherwise using data stream S1. The reader groups RGI and RG2 respectively publish stream cuts SC1 and SC2 to indicate consumed positions relative to the data stream S1. Both automatic and manual submission/publication of stream cuts will now be defined relative to FIG. 3.

Any individual reader and/or group of readers can submit stream cuts automatically and/or manually.

Regarding automatic publication of specified stream cuts, a reader group can submit a checkpoint either automatically or via one or more explicit API calls. In one or more embodiments, a specified stream cut can be published by a reader, group and/or controller entity relative to a single reader, where such publication is approved and/or pre-approved by readers of a group, if applicable.

In one or more other embodiments, checkpoints can be employed to first align all readers' consumption (e.g., of a group of readers) relative to a data stream. A respective stream cut is not published until all readers have read beyond a checkpoint. For example, a checkpoint can comprise coordinating the position across all readers in the group and all events from which all readers are reading, at checkpoint time. Once a reader learns of an ongoing checkpoint (e.g., internally via shared reader group state), a reader can emit a checkpoint for that given reader. The checkpoint for a given reader in the reader group can separate the data events before the checkpoint and the data events after the checkpoint. Reading a data event after the checkpoint event can indicate that the corresponding reader has read and consumed all events before the checkpoint. Once all readers read beyond their corresponding checkpoint events, a stream cut corresponding to the position of the checkpoint can be published, such as transmitting to the user facilitation component 110, as an acknowledgement for the consumed position of the respective reader group.

Additionally and/or alternatively, regarding manual publication of stream cuts, checkpoints can be generated relative to the stream by the user entity, such as by an application (e.g., reading application) being employed by the user entity. The application can determine to publish a stream cut corresponding to a checkpoint to the user facilitation component 110, for example, once the application determines that the application is finished with data in the data stream prior to the checkpoint.

Example Truncation Determination

In connection with the above, it will be appreciated that the stream cut data received and/or stored by the user facilitation component 110, in addition to one or more other limits relative, for example, to time and/or storage space, can be employed by the truncation component 112. That is, relative to such data, the truncation component 112 can facilitate maintenance of a data stream, such as including truncation of a data stream to thereby reclaim storage space for use in continually storing additional data and/or events written, appended and/or otherwise published to the respective data stream (and/or to another data stream). Turning now to the truncation component 112, truncation can be executed according to time and/or space quantities or according to a combination of consumption, time and/or space. That is, as indicated above relative to the facilitation component 110, one or more reader entities of a data stream and/or controller entities, relative to a group of one or more reader entities, can selectively determine what type of truncation protocol to be employed for one or more data streams assigned to the one or more reader entities and/or controller entities.

To facilitate truncation, one or more algorithms can be comprised by the truncation component 112 and/or employed by the truncation component 112.

A determination algorithm can be employed by the truncation component 112 to identify whether a consumption-based algorithm or a non-consumption-based algorithm is to be employed for a truncation. The determination algorithm can be run continuously and/or at any other frequency, such as selectively determined by one or more reader entities relative to a data stream, such as via the user facilitation component 110. Additionally, and/or alternatively, in one or more embodiments, the determination algorithm can run any time a specified stream cut is posted, for example at the LUT 132. In one or more embodiments, the determination algorithm can run any only when specified stream cut is posted, for example at the LUT 132.

It will be appreciated that one or more algorithms employed by the truncation component 112 will now be described relative to submission of stream cuts by subscribers. The term "subscriber" can refer to a reader, reader entity, group, controlling entity and/or the like.

Figure 4:
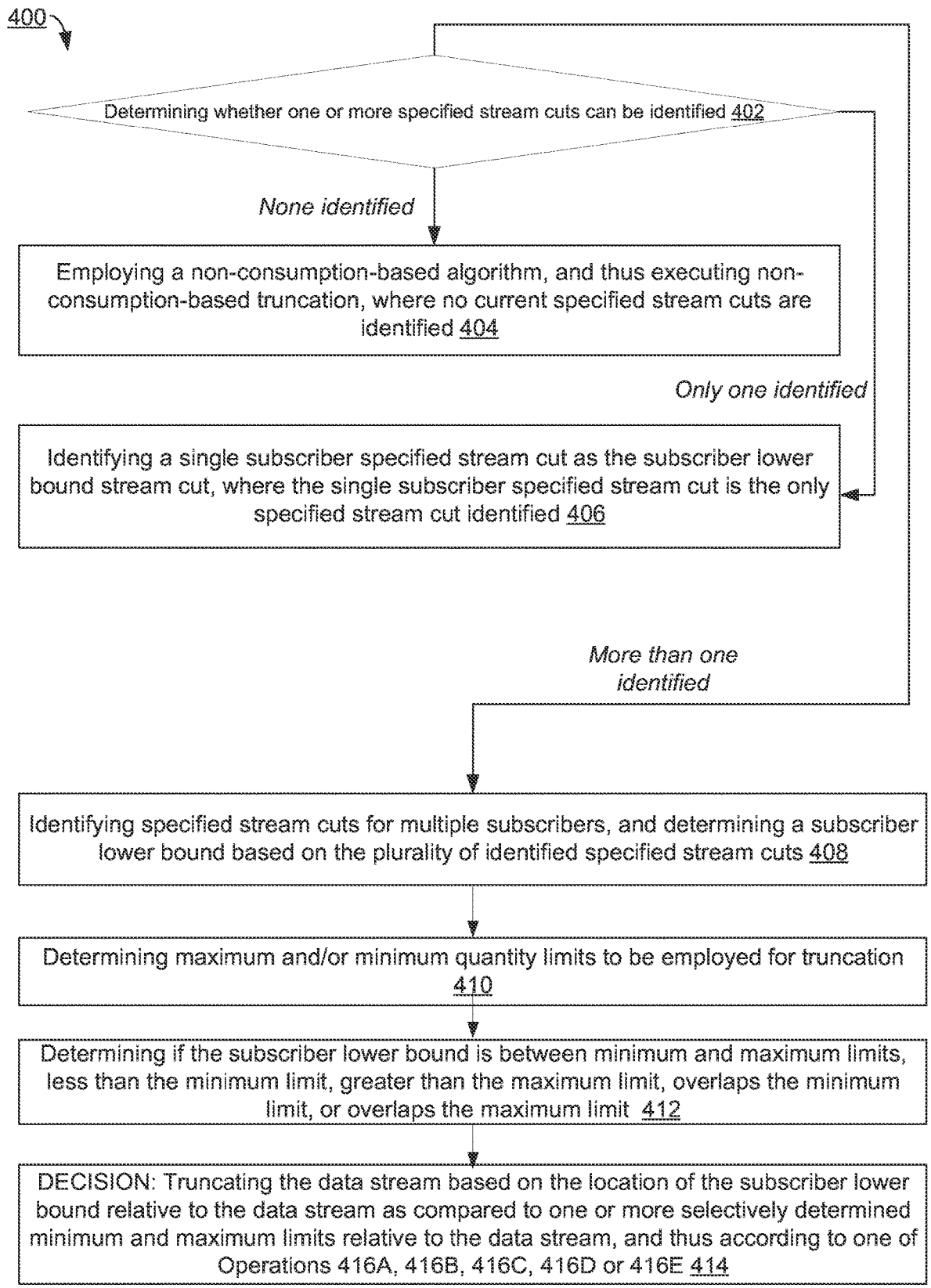
FIG. 4 illustrates an example process flow that can facilitate a process to reclaim storage space relative to one or more data streams employing the storage space, in accordance with one or more embodiments described herein.

Referring now also to FIG. 4, in addition to FIGS. 1 and 3, a flow diagram of an example, non-limiting computer-implemented method 400 that can facilitate a process to truncate a data stream is described, in accordance with a determination algorithm, and in accordance with one or more embodiments described herein with respect to the non-limiting system architecture 100. Repetitive description of like elements and/or processes employed in respective embodiments is omitted for sake of brevity.

Figure 5:
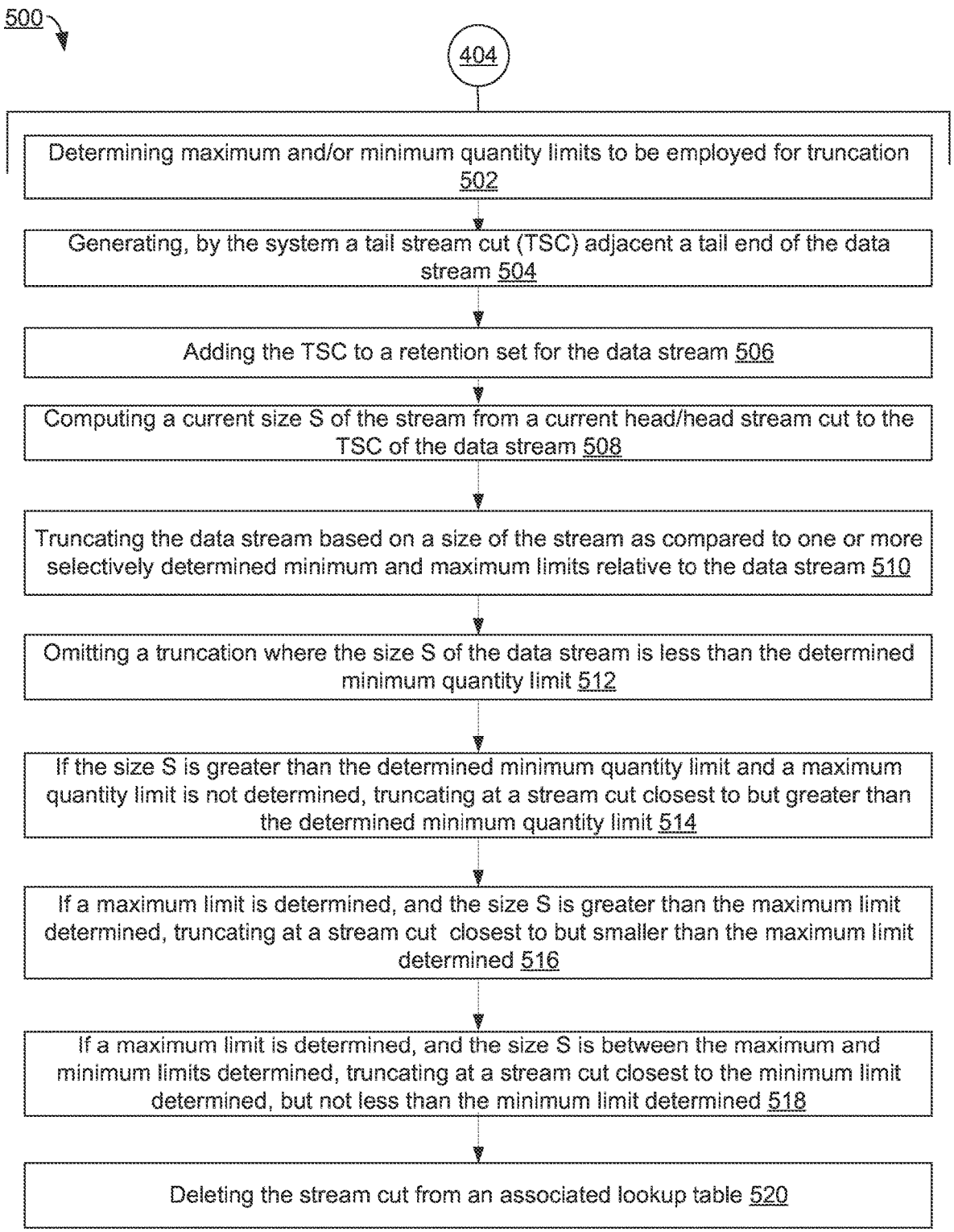
FIG. 5 illustrates an example process flow that can facilitate a process to reclaim storage space relative to one or more data streams employing the storage space, comprising a non-consumption-based process, in accordance with one or more embodiments described herein, and in accordance with the illustration at FIG. 2.

When the determination algorithm is run, one or more operations can be employed:

Operation 402 depicts a decision for determining, by the system (e.g., truncation component 112) whether one or more specified stream cuts can be identified. The truncation component 112 can search for, such as at the knowledge database 130 and LUT 132, one or more specified stream cuts. Where previous stream cuts employed are not deleted from a storage database, this search can comprise identifying only specified stream cuts having been published after a previously-used specified stream cut.

Where no stream cuts are identified at operation 402, the determination algorithm can proceed to operation 404. Operation 404 can comprise employing, by the system, a non-consumption-based algorithm, and thus executing non-consumption-based truncation, where no current specified stream cuts are identified. The truncation component 112 can employ the non-consumption-based algorithm, to be discussed below. Operations 502 to 520 comprised by operation 404 are illustrated at FIG. 5.

Alternatively, where only one stream cut is identified at operation 402, the determination algorithm can proceed to operation 406. Operation 406 can comprise identifying, by the system (e.g., truncation component 112) a single subscriber specified stream cut as the subscriber lower bound stream cut, where the single subscriber specified stream cut is the only specified stream cut identified.

Also alternatively, where more than one stream cut is identified at operation 402, the determination algorithm can proceed to operation 408. Operation 408 can comprise identifying, by the system (e.g., truncation component 112) specified stream cuts for multiple subscribers, and determining, by the system (e.g., truncation component 112) a subscriber lower bound based on the plurality of identified specified stream cuts.

For example, in one or more embodiments, the subscriber lower bound is determined to be an upstream-most specified stream cut of the plurality of identified specified stream cuts. In one or more other embodiments, the subscriber lower bound is determined such that truncating at the subscriber lower bound limits and/or altogether prevents loss of data that has been as of yet unconsumed by one or more of the subscribers of the plurality of identified specified stream cuts. In one or more other embodiments, the subscriber lower bound can be determined from one or more lookup tables and/or other data tables, such as where the subscriber lower bound is determined (e.g., calculated) by a system and/or components external to the non-limiting system architecture 100.

Operation 410 can comprise determining, by the system (e.g., truncation component 112) one or more maximum and/or minimum quantity limits to be employed for truncation, such as approved by the respective subscribers and/or a controller entity of a group of the subscribers.

Operation 412 can comprise determining, by the system (e.g., truncation component 112), if the subscriber lower bound is between minimum and maximum limits, less than the minimum limit, greater than the maximum limit, overlaps the minimum limit, or overlaps the maximum limit. This determination can be made via comparison as understood by one having ordinary skill in the art.

Operation 414 can comprise a decision for truncating the data stream (e.g., data stream 152), by the system (e.g., truncation component 112) based on the location of the subscriber lower bound relative to the data stream (e.g., data stream 152) as compared to one or more selectively determined minimum and maximum limits relative to the data stream (e.g., data stream 152), and thus according to one of operations 416A, 416B, 416C, 416D or 416E described below.

Figure 6:
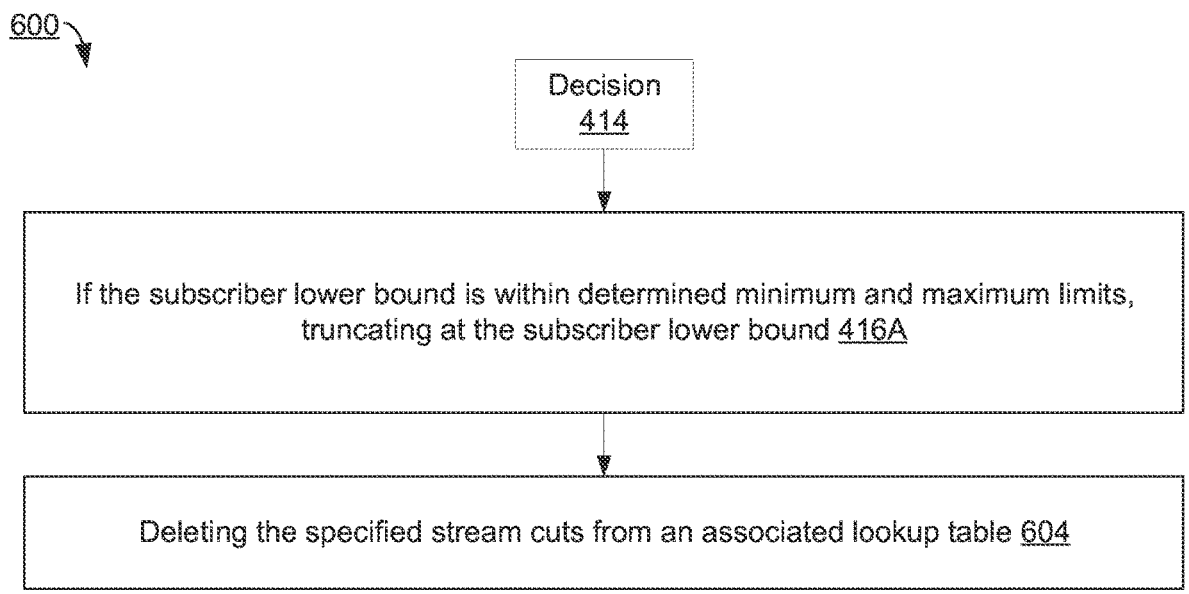
FIG. 6 illustrates an example process flow that can facilitate a process to reclaim storage space relative to one or more data streams employing the storage space, comprising a consumption-based process, in accordance with one or more embodiments described herein.
Figure 8:
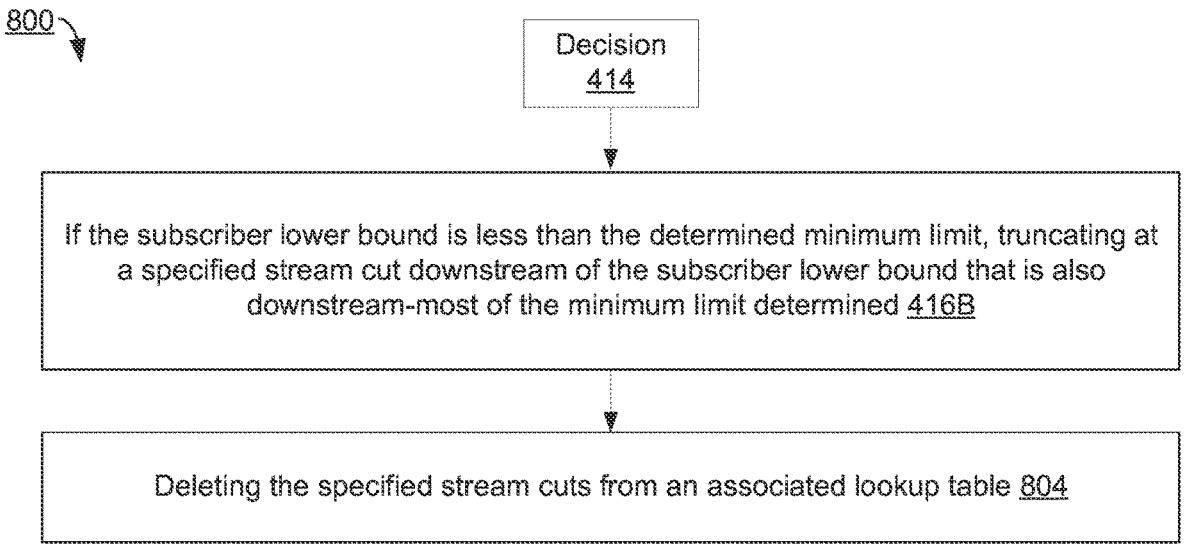
FIG. 8 illustrates an example process flow that can facilitate a process to reclaim storage space relative to one or more data streams employing the storage space, comprising a consumption-based process, in accordance with one or more embodiments described herein.
Figure 12:
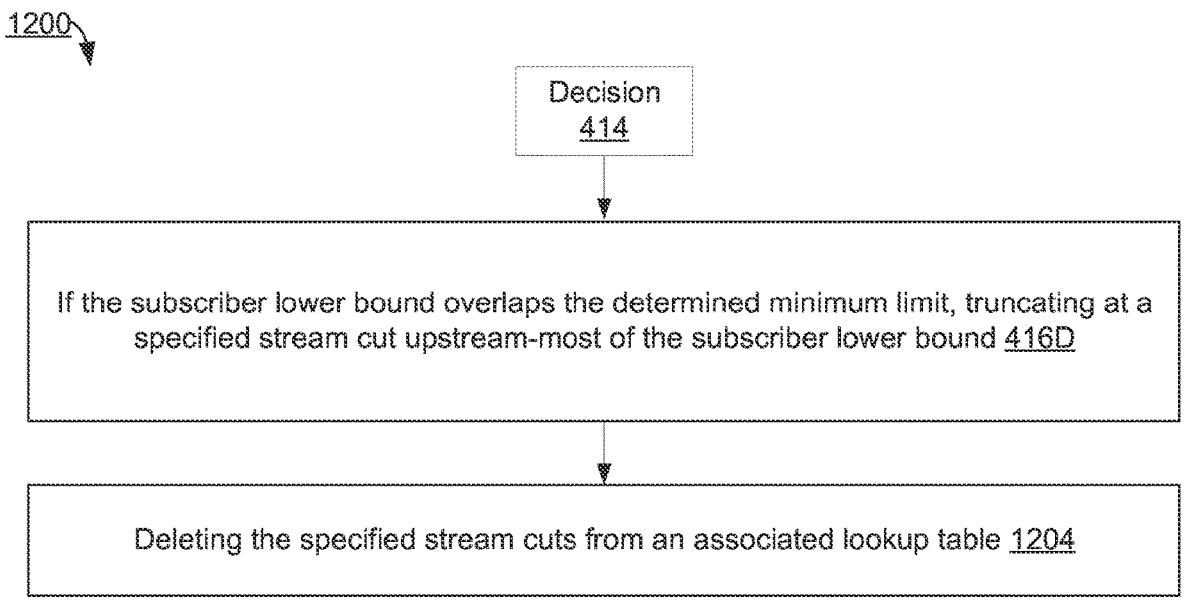
FIG. 12 illustrates an example process flow that can facilitate a process to reclaim storage space relative to one or more data streams employing the storage space, comprising a consumption-based process, in accordance with one or more embodiments described herein.
Figure 14:
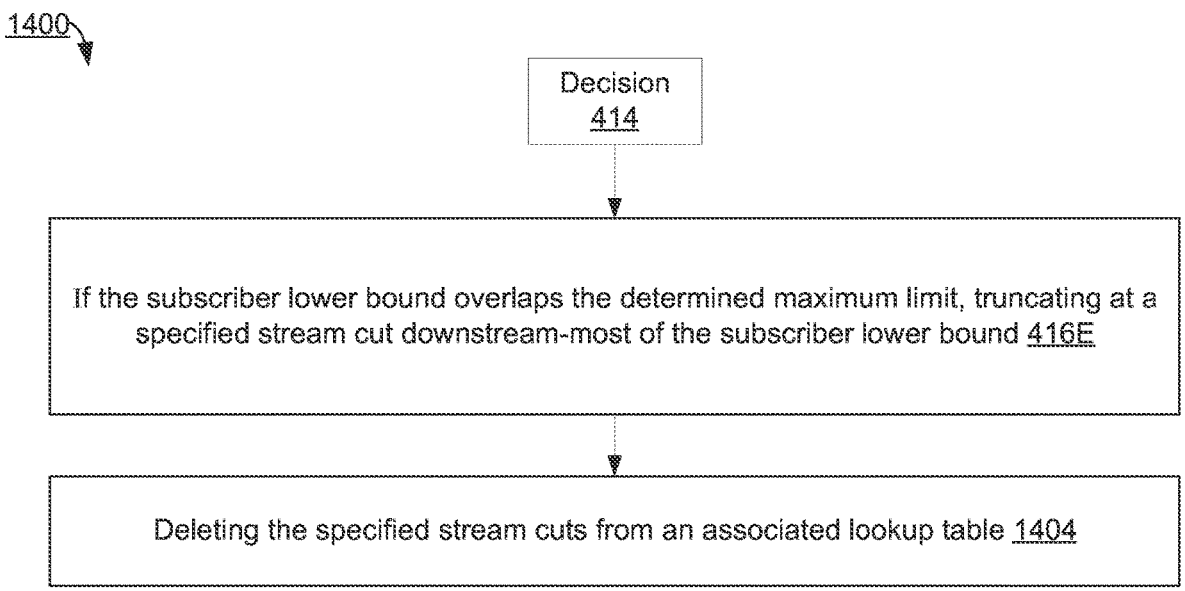
FIG. 14 illustrates an example process flow that can facilitate a process to reclaim storage space relative to one or more data streams employing the storage space, comprising a consumption-based process, in accordance with one or more embodiments described herein.

Operation 416A and one or more operations continuing therefrom are illustrated at FIG. 6. Operation 416B and one or more operations continuing therefrom are illustrated at FIG. 8. Operation 416C and one or more operations continuing therefrom are illustrated at FIG. 10. Operation 416D and one or more operations continuing therefrom are illustrated at FIG. 12. Operation 416E and one or more operations continuing therefrom are illustrated at FIG. 14.

Referring still to the user facilitation component 110 and to FIG. 1, one or more additional processes can be facilitated.

If a user application (e.g., allowing for the reading and/or other use of the data stream) temporarily goes down or is not able to publish its consumed positions, then a respective data stream is not truncated until the respective user application comes back up. This is because a previous truncation relative to a previously published specified stream cut is not moved, and indeed can have been deleted, thus leaving no current specified stream cut to be employed by the storage reclamation system 102.

Furthermore, if no specified stream cut is published, and the data stream grows beyond a maximum limit set for the data stream, the truncation component 112 can be triggered to automatically truncate the data stream, such as employing the non-consumption-based algorithm, because a specified stream cut is not present, as at operation 404 (FIG. 4).

Further, it will be appreciated that the storage reclamation system 102 can facilitate one or more other processes relative to one or more data streams, such as merging of events and/or streams, splitting of events and/or streams and/or the like.

Example Non-Consumption-Based Truncation

Absent a consumption-based protocol corresponding to a data stream, a non-consumption-based algorithm can be employed by the truncation component 112 to truncate a data stream relative to the determined maximum and minimum quantity limits employed for the respective data stream. As indicated above, such quantity can be time-based and/or storage space-based.

For example, looking again to FIG. 5 and FIG. 2, a flow diagram is illustrated at FIG. 5 relative to the data stream representation 200 at FIG. 2. The flow diagram illustrates an example, non-limiting computer-implemented method 500 that can facilitate a process to truncate a data stream, in accordance with a determination algorithm, and in accordance with one or more embodiments described herein with respect to the non-limiting system architecture 100. Repetitive description of like elements and/or processes employed in respective embodiments is omitted for sake of brevity.

Operations of method 500 comprise operations where a retention policy has been set for truncation of a data stream. Operations of method 500 are a continuation of method 400, such as continuing from Operation 404. It will be appreciated that the same operations can be executed by the truncation component 112 where space has completely run out for a data stream at a stream storage system.

Operation 502 comprises determining, by the system (e.g., truncation component 112 and/or user facilitation component 110) maximum and/or minimum quantity limits to be employed for truncation.

Relative to FIG. 2, data upstream of (succeeding) the minimum or maximum limit is retained (e.g., data from tail end), while data downstream of (preceding) the minimum or maximum limit (e.g., data from the head end) is truncated, such as being removed and/or deleted. For example, where the minimum limit is 20 G of storage space, truncation at the minimum limit would leave only the stream between the minimum limit and the tail end. Where the maximum limit is 100 G of storage space, truncation at the maximum limit would leave only the stream between the maximum limit and the tail end. Thus, truncation at the maximum limit would leave a larger quantity of storage space still employed by the data stream than truncation at the minimum limit.

It will be appreciated that the illustrate limits of 20 G and 100 G are merely examples, and thus any suitable units and/or quantities can be employed for one or more ranges. Further, as will be appreciated below, only a maximum limit or only a minimum limit can be determined.

Further, it will be appreciated that the stream cuts illustrated at FIG. 2 are not specified stream cuts based on consumption, but rather are locations (e.g., stream cuts) generated relative to time and/or space quantity.

Operation 504 comprises generating, by the system (e.g., truncation component 112), a tail stream cut TSC adjacent a tail end of the data stream, such as where writers still can be appending data.

Operation 506 comprises adding, by the system (e.g., truncation component 112), the TSC to a retention set for the data stream.

Operation 508 comprises computing, by the system (e.g., truncation component 112), a current size S of the data stream from the head (e.g., at the head stream cut HSC) to the tail stream cut TSC.

Operation 510 comprises truncating, by the system (e.g., truncation component 112), the data stream based on the computed size S of the stream. It will be appreciated that only one of operations 512-518 may be employed, due to the requirements of these operations, as described below.

Operation 512 comprises omitting a truncation, by the system (e.g., truncation component 112), where the size S of the data stream is less than the determined minimum quantity limit.

Operation 514 comprises, if the size S is greater than the determined minimum quantity limit and a maximum quantity limit is not determined, truncating, by the system (e.g., truncation component 112), at a stream cut (e.g., SC4) closest to but greater than the determined minimum quantity limit. In this way, truncation leaves more data in the stream S than the determined minimum quantity limit.

Operation 516 comprises, if a maximum limit is determined, and the size S is greater than the maximum limit determined, truncating, by the system (e.g., truncation component 112) at a stream cut (e.g., SC1) closest to but smaller than the maximum limit determined. In this way, truncation leaves less data in the stream S than the maximum limit but more data in the stream S than the minimum limit.

Operation 518 comprises, if a maximum limit is determined, and the size S is between the maximum and minimum limits determined, truncating, by the system (e.g., truncation component 112) at a stream cut (e.g., SC4) closest to the minimum limit determined, but not less than the minimum limit determined. In this way, truncation leaves less data in the stream S than the maximum limit but more data in the stream S than the minimum limit.

Operation 520 comprises deleting, by the system (e.g., truncation component 112), the stream cut from an associated lookup table (e.g., lookup table 132) and/or otherwise relative to the stream storage system (e.g., stream storage system 150).

Accordingly, in the example of FIG. 2, the determined size S of the stream is 150 G, which is greater than the maximum limit 100 G, and both a minimum limit and a maximum limit are determined. As such, of operations 512-518, operation 516 is employed, and SC1 is the new head after truncation.

Example Consumption-Based Truncation

Turning now to FIGS. 6-14, FIGS. 6, 8, 10, 12 and 14 each illustrate a flow diagram relative to an algorithm or a sub-algorithm for truncating a data stream based on a different location of the subscriber lower bound relative to the selectively determined maximum and minimum limits corresponding to the same data stream. The flow diagrams of FIGS. 6, 8, 10, 12 and 14 each are a continuation of the flow diagram of FIG. 4. That is, each of the methods 600, 800, 1000, 1200 and 1400 at the respective FIGS. 6, 8, 10, 12 and 14 can represent a continuation of the method 400 at FIG. 4. Indeed, each of FIGS. 6, 8, 10, 12 and 14 illustrate a specific operation 416 (e.g., operations 416A, 416B, 416C, 416D and 416E) depending on the outcome of the determination operation 414.

FIGS. 7, 9, 11, 13 and 15 respectively correspond to FIGS. 6, 8, 10, 12 and 14 and each illustrate the respective processes of FIGS. 6, 8, 10, 12 and 14 executed at respective data stream representations 700, 900, 1100, 1300 and 1500 of the same data stream 152.

Figure 7:
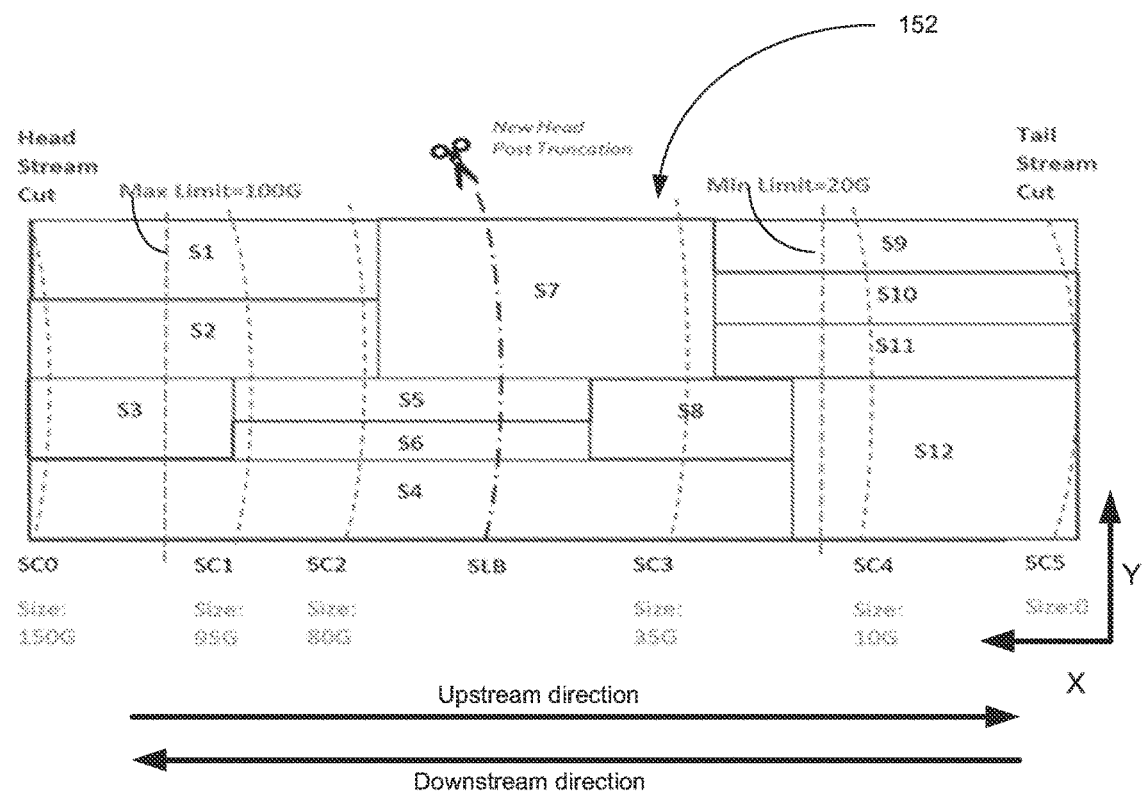
FIG. 7 illustrates an exemplary diagram of a stream that can be maintained by the example process flow of FIG. 6, in accordance with one or more embodiments described herein.

Turning first to FIGS. 6 and 7, FIG. 6 illustrates a flow diagram of an example, non-limiting computer-implemented method 600 that can facilitate a process to truncate a data stream as diagrammatically illustrated at FIG. 7, in accordance with one or more embodiments described herein with respect to the non-limiting system architecture 100. As indicated above, method 600 is a continuation of method 400. Repetitive description of like elements and/or processes employed in respective embodiments is omitted for sake of brevity.

Operation 416A comprises, if the subscriber lower bound is within determined minimum and maximum limits, such as determined at operation 412, truncating, by the system (e.g., truncation component 112) at the subscriber lower bound. In this way, remaining at the data stream is less data than the determined maximum limit but more data than the determined minimum limit. See, for example, a new head after truncation at SLB at data stream representation 700. SLB is between the determined minimum and maximum limits.

Operation 604 comprises deleting, by the system (e.g., truncation component 112), the specified stream cuts from an associated lookup table (e.g., lookup table 132) and/or otherwise relative to the stream storage system (e.g., stream storage system 150).

Figure 9:
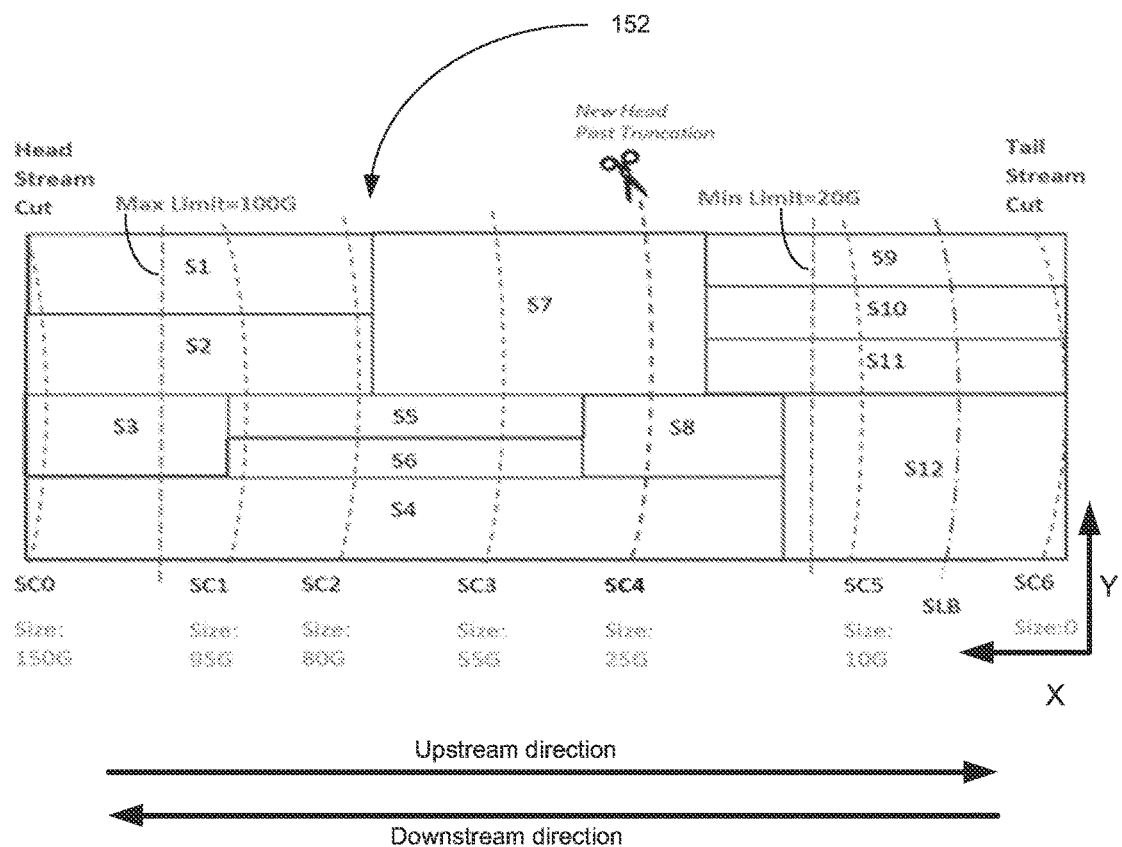
FIG. 9 illustrates an exemplary diagram of a stream that can be maintained by the example process flow of FIG. 8, in accordance with one or more embodiments described herein.

Turning next to FIGS. 8 and 9, FIG. 8 illustrates a flow diagram of an example, non-limiting computer-implemented method 800 that can facilitate a process to truncate a data stream as diagrammatically illustrated at FIG. 9, in accordance with one or more embodiments described herein with respect to the non-limiting system architecture 100. As indicated above, method 800 is a continuation of method 400. Repetitive description of like elements and/or processes employed in respective embodiments is omitted for sake of brevity.

Operation 416B comprises, if the subscriber lower bound is less than the determined minimum limit, such as determined at operation 412, truncating, by the system (e.g., truncation component 112), at a specified stream cut downstream of (preceding) the subscriber lower bound that is also downstream of (preceding) and closest to the minimum limit determined. In this way, remaining at the data stream is a minimum quantity of data that is still within the determined minimum limit. See, for example, a new head after truncation at SC4 at data stream representation 900. SLB is less than the determined minimum limit.

Put another way, operation 416B comprises truncating, by the system (e.g., truncation component 112), at a different one of the one or more specified cut positions of the stream that is downstream to (preceding) the subscriber lower bound, in response to a determination that such truncation of the stream at the subscriber lower bound leaves (e.g., would leave) a quantity that is not within the determined threshold range (e.g., within determined maximum and minimum limits) of the stream storage system, such as being a quantity of stream remaining after truncation that is less than a determined lower quantity limit of the stream storage system.

It will be appreciated that such truncation, as illustrated at FIG. 9, can include truncation of the SLB.

Operation 804 comprises deleting, by the system (e.g., truncation component 112), the specified stream cuts from an associated lookup table (e.g., lookup table 132) and/or otherwise relative to the stream storage system (e.g., stream storage system 150).

Figure 11:
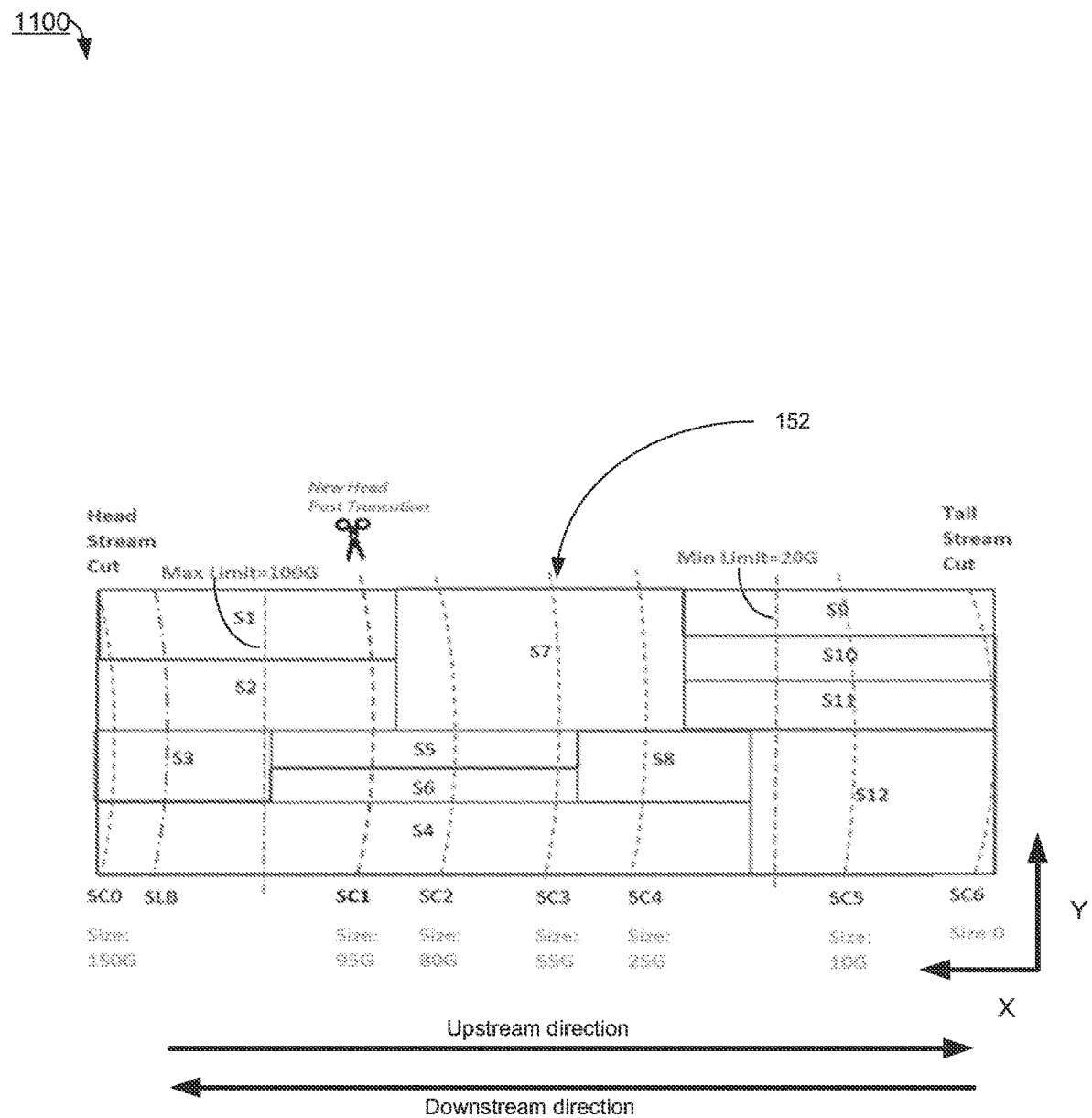
FIG. 11 illustrates an exemplary diagram of a stream that can be maintained by the example process flow of FIG. 10, in accordance with one or more embodiments described herein.

Turning first to FIGS. 10 and 11, FIG. 10 illustrates a flow diagram of an example, non-limiting computer-implemented method 1000 that can facilitate a process to truncate a data stream as diagrammatically illustrated at FIG. 11, in accordance with one or more embodiments described herein with respect to the non-limiting system architecture 100. As indicated above, method 1000 is a continuation of method 400. Repetitive description of like elements and/or processes employed in respective embodiments is omitted for sake of brevity.

Operation 416C comprises, if the subscriber lower bound is greater than the determined maximum limit, truncating, by the system (e.g., truncation component 112), at a specified stream cut upstream of (succeeding) the subscriber lower bound that is also upstream of (succeeding) and closest to the maximum limit determined. In this way, remaining at the data stream is a maximum quantity of data that is still within the determined maximum limit. See, for example, a new head after truncation at SC1 at data stream representation 1100. SLB is greater than the determined maximum limit.

Put another way, operation 416C comprises truncating, by the system (e.g., truncation component 112), at a different one of the one or more specified cut positions of the stream that is upstream to (succeeding) the subscriber lower bound, in response to a determination that such truncation of the stream at the subscriber lower bound leaves (e.g., would leave) a quantity that is not within the determined threshold range (e.g., within determined maximum and minimum limits) of the stream storage system, such as being a quantity of stream remaining after truncation that is greater than a determined upper quantity limit of the stream storage system.

It will be appreciated that such truncation, as illustrated at FIG. 11, can include truncation of the SLB.

Operation 1004 comprises deleting, by the system (e.g., truncation component 112), the specified stream cuts from an associated lookup table (e.g., lookup table 132) and/or otherwise relative to the stream storage system (e.g., stream storage system 150).

Figure 13:
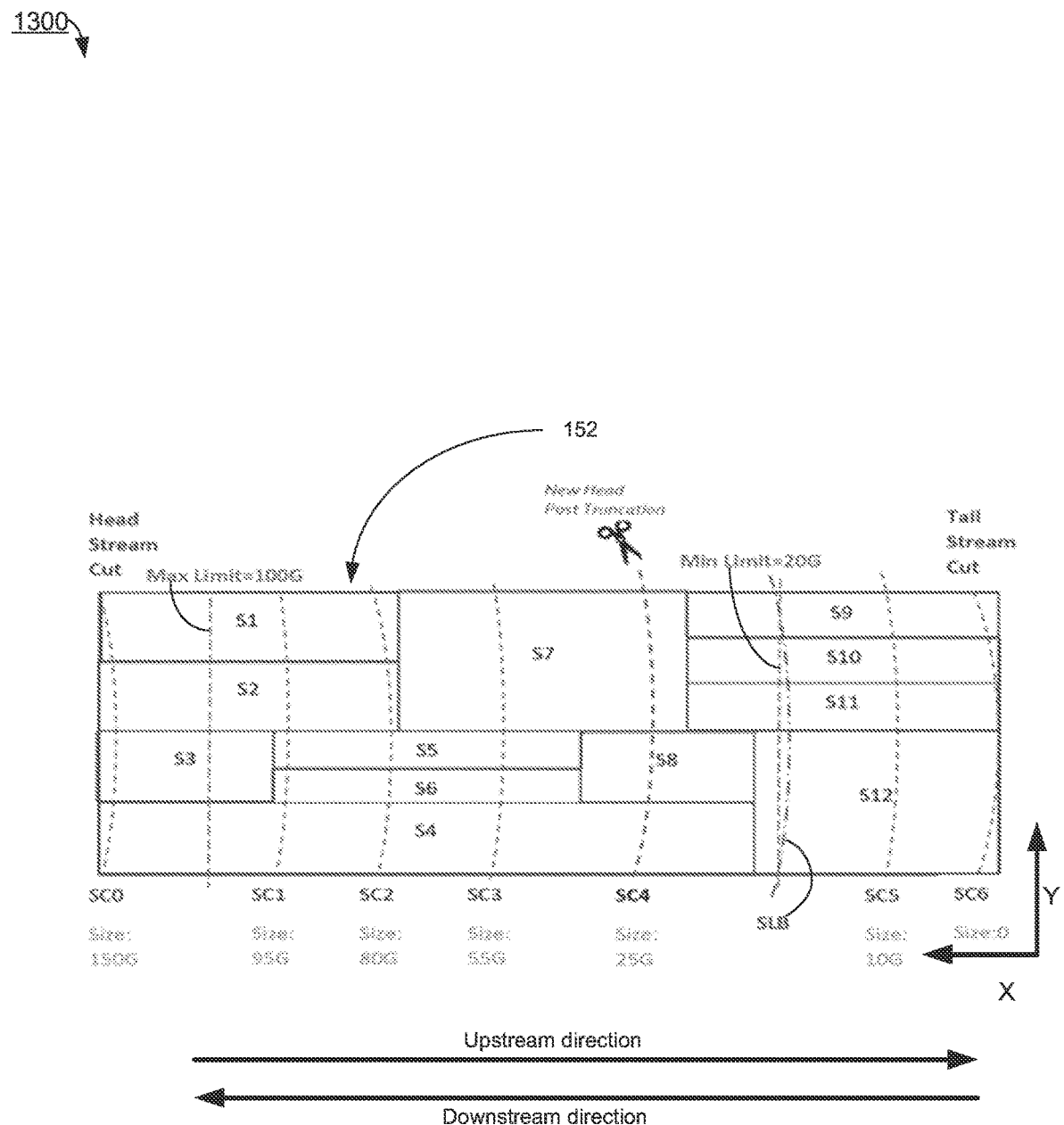
FIG. 13 illustrates an exemplary diagram of a stream that can be maintained by the example process flow of FIG. 12, in accordance with one or more embodiments described herein.

Turning first to FIGS. 12 and 13, FIG. 12 illustrates a flow diagram of an example, non-limiting computer-implemented method 1200 that can facilitate a process to truncate a data stream as diagrammatically illustrated at FIG. 13, in accordance with one or more embodiments described herein with respect to the non-limiting system architecture 100. As indicated above, method 1200 is a continuation of method 400. Repetitive description of like elements and/or processes employed in respective embodiments is omitted for sake of brevity.

Operation 416D comprises, if the subscriber lower bound overlaps the determined minimum limit, truncating, by the system (e.g., truncation component 112), at a specified stream cut downstream of (preceding) and closest to the subscriber lower bound/minimum limit overlap. In this way, a minimum quantity more than the SLB is retained at the data stream. See, for example, a new head after truncation at SC4 at data stream representation 1300. SLB overlaps the determined minimum limit.

Put another way, operation 416D comprises truncating, by the system (e.g., truncation component 112), at a different of the one or more specified cut positions of the stream, other than the subscriber lower bound, that is downstream (preceding), such as immediately adjacent downstream to (preceding), the subscriber lower bound, in response to the subscriber lower bound overlapping a determined lower quantity limit of the stream storage system.

Operation 1204 comprises deleting, by the system (e.g., truncation component 112), the specified stream cuts from an associated lookup table (e.g., lookup table 132) and/or otherwise relative to the stream storage system (e.g., stream storage system 150).

Figure 15:
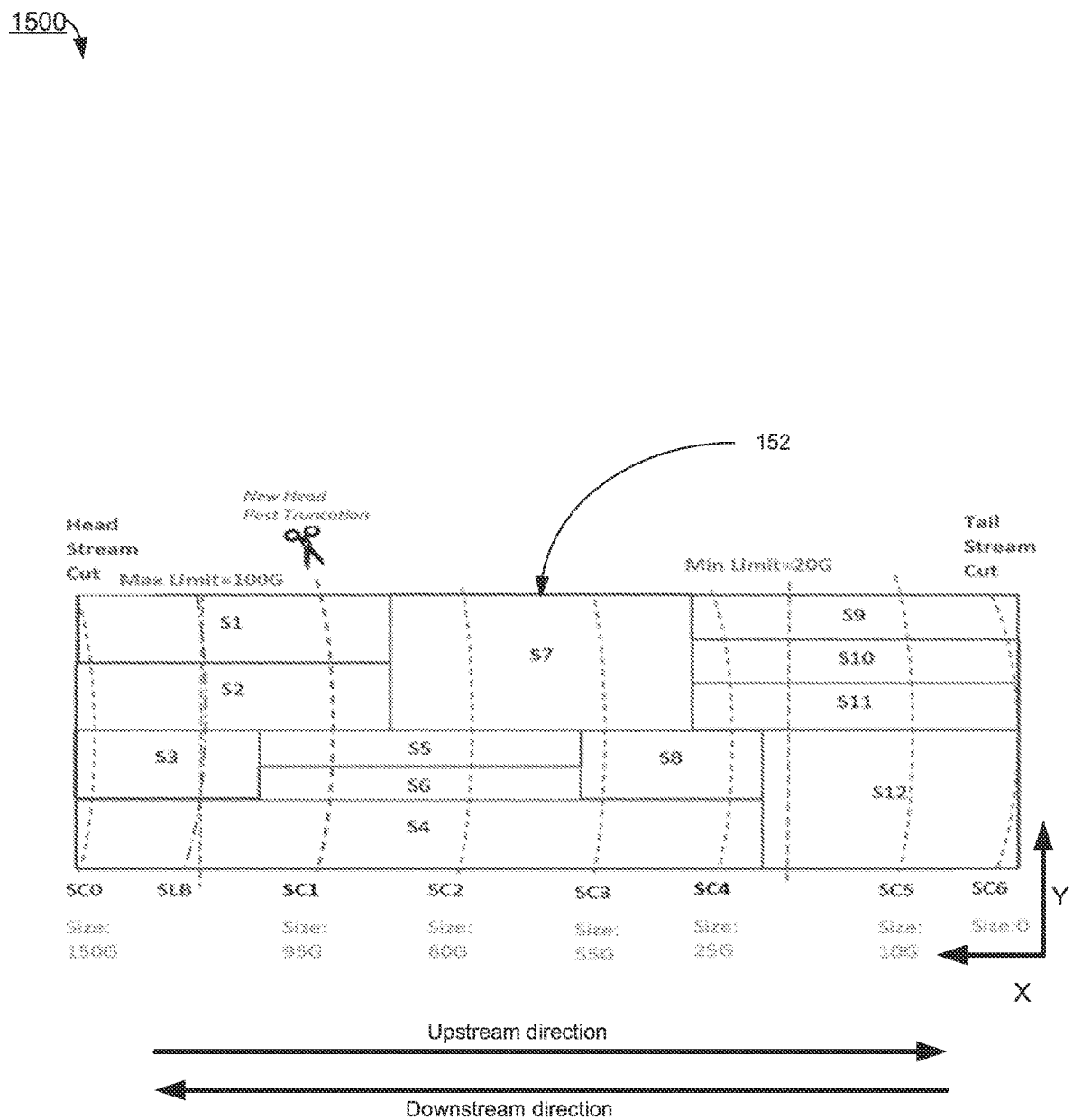
FIG. 15 illustrates an exemplary diagram of a stream that can be maintained by the example process flow of FIG. 14, in accordance with one or more embodiments described herein.

Turning first to FIGS. 14 and 15, FIG. 14 illustrates a flow diagram of an example, non-limiting computer-implemented method 1400 that can facilitate a process to truncate a data stream as diagrammatically illustrated at FIG. 15, in accordance with one or more embodiments described herein with respect to the non-limiting system architecture 100. As indicated above, method 1400 is a continuation of method 400. Repetitive description of like elements and/or processes employed in respective embodiments is omitted for sake of brevity.

Operation 416E comprises, if the subscriber lower bound overlaps the determined maximum limit, truncating, by the system (e.g., truncation component 112), at a specified stream cut upstream of (succeeding) and closest to the subscriber lower bound/maximum limit overlap. In this way, a minimum quantity less than the SLB is retained at the data stream. See, for example, a new head after truncation at SC1 at data stream representation 1500. SLB overlaps the determined maximum limit.

Put another way, operation 416E comprises truncating, by the system (e.g., truncation component 112), at a different of the one or more specified cut positions of the stream, other than the subscriber lower bound, that is upstream (succeeding), such as immediately adjacent upstream to (succeeding), the subscriber lower bound, in response to the subscriber lower bound overlapping a determined upper quantity limit of the stream storage system.

Operation 1404 comprises deleting, by the system (e.g., truncation component 112), the specified stream cuts from an associated lookup table (e.g., lookup table 132) and/or otherwise relative to the stream storage system (e.g., stream storage system 150).

Finally, the truncation component 112 can repeat one or more of the aforementioned processes at any suitable frequency, as indicated above.

Example Process Flow

Figure 16:
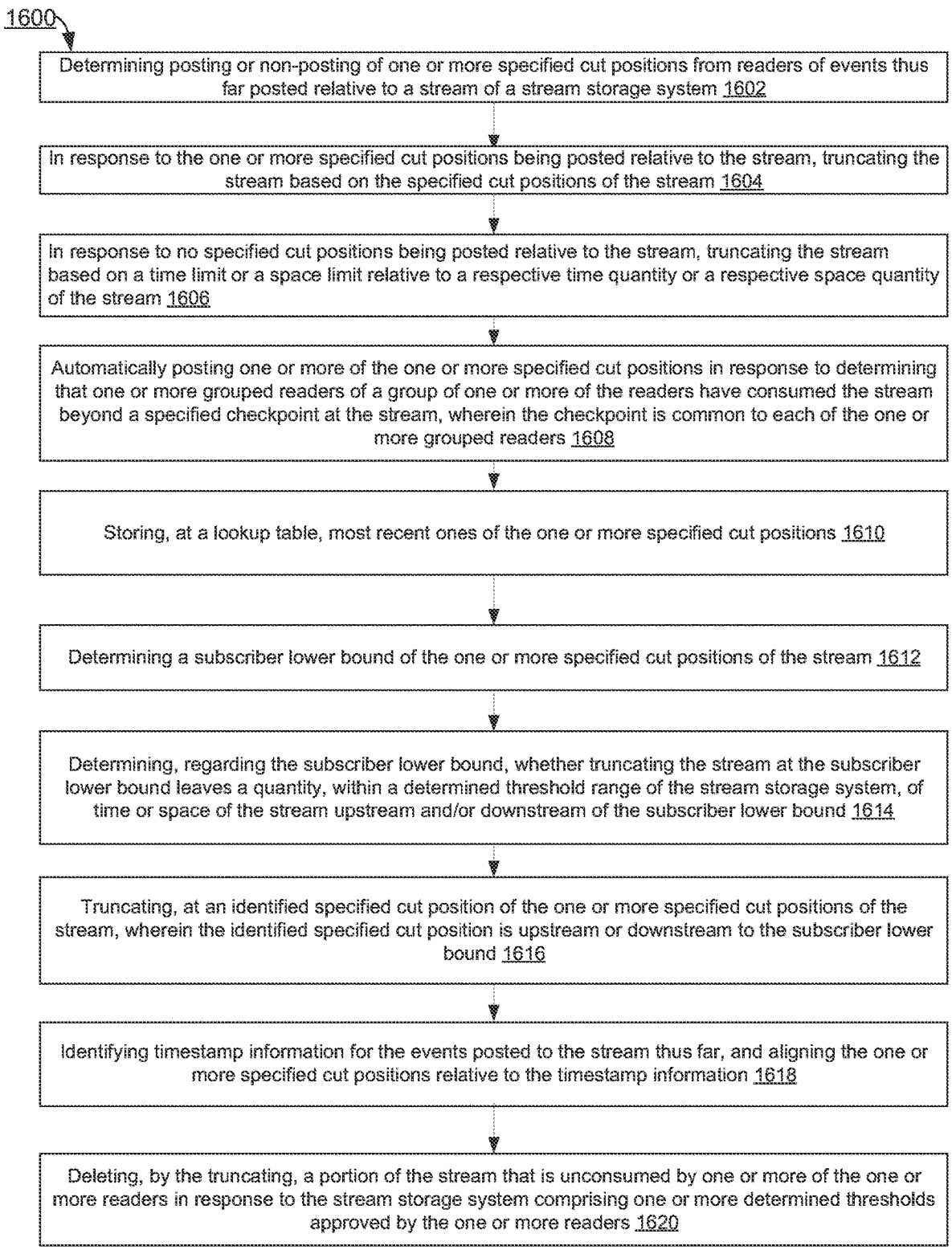
FIG. 16 illustrates an example process flow that can facilitate a process to reclaim storage space relative to one or more data streams employing the storage space, in accordance with one or more embodiments described herein.

Turning now to FIG. 16, another example process flow is illustrated relative to the non-limiting system architecture 100 at FIG. 1. The flow diagram illustrated at FIG. 16 provides an example, non-limiting computer-implemented method 1600 that can facilitate a process to truncate a data stream and thus reclaim storage space, in accordance with one or more embodiments described herein. Repetitive description of like elements and/or processes employed in respective embodiments is omitted for sake of brevity.

Operation 1602 can comprise determining, by the system (e.g., determination component 108), posting or non-posting of one or more specified cut positions from readers of events thus far posted relative to a stream of a stream storage system.

Operation 1604 can comprise, in response to the one or more specified cut positions being posted relative to the stream, truncating, by the system (e.g., truncation component 112), the stream based on the specified cut positions of the stream.

Operation 1606 can comprise, in response to no specified cut positions being posted relative to the stream, truncating, by the system (e.g., truncation component 112), the stream based on a time limit or a space limit relative to a respective time quantity or a respective space quantity of the stream.

Operation 1608 can comprise, automatically posting, by the system (e.g., user facilitation component 110), one or more of the one or more specified cut positions in response to determining that one or more grouped readers of a group of one or more of the readers have consumed the stream beyond a specified checkpoint at the stream, wherein the checkpoint is common to each of the one or more grouped readers.

Operation 1610 can comprise, storing, by the system (e.g., user facilitation component 110), at a lookup table, most recent ones of the one or more specified cut positions.

Operation 1612 can comprise, determining, by the system (e.g., truncation component 112) a subscriber lower bound of the one or more specified cut positions of the stream.

Operation 1614 can comprise, determining, by the system (e.g., truncation component 112), regarding the subscriber lower bound, whether truncating the stream at the subscriber lower bound leaves a quantity, within a determined threshold range of the stream storage system, of time or space of the stream downstream of (preceding) and/or upstream of (succeeding) the subscriber lower bound.

Operation 1616 can comprise, truncating, by the system (e.g., truncation component 112), at an identified specified cut position of the one or more specified cut positions of the stream, wherein the identified specified cut position is upstream to (succeeding) or downstream to (preceding) the subscriber lower bound. In one or more embodiments, the identified specified cut position can be respectively immediately upstream to (immediately succeeding) or immediately downstream to (immediately preceding) the subscriber lower bound.

Operation 1618 can comprise, identifying, by the system (e.g., user facilitation component 110), timestamp information for the events appended to one or more segments of the stream thus far; and aligning the one or more specified cut positions relative to the timestamp information.

Operation 1620 can comprise, deleting, by the system (e.g., truncation component 112), by the truncating, a portion of the stream that is unconsumed by one or more of the one or more readers in response to the stream storage system comprising one or more determined thresholds approved by the one or more readers. In such case, although such portion can be unconsumed by a reader, the truncation can occur based on the higher order threshold.

Comprehensive Summary

For simplicity of explanation, the computer-implemented methodologies provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. It can be appreciated that the operating procedures of process flows 400, 500, 600, 800, 1000, 1200, 1400 and 1600 are example operating procedures, and that there can be embodiments that implement more or fewer operating procedures than are depicted.

Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, the one or more embodiments described herein can facilitate a process to reclaim storage space relative to one or more data streams employing the storage space. A system architecture 100 can comprise a processor 104, and a memory 106 that stores computer executable instructions that, when executed by the processor 104, facilitate performance of operations. The operations can comprise determining posting or non-posting of one or more specified cut positions from readers of events thus far appended to segments 160 of a stream 152 of a stream storage system 150. The operations can further comprise, in response to the one or more specified cut positions being posted, truncating the stream 152 based on the specified cut positions of the stream 152, and, in response to no specified cut positions being posted, truncating the stream 152 based on a time limit or a space limit relative to a respective time quantity or a respective space quantity of the stream 152.

In view of employment of the one or more embodiments described herein, such as of the storage reclamation system 102, data streams stored at a data storage system can be truncated according to consumption, rather than only based upon given time and/or storage space quantities relative to the stream. This can be particularly useful relative to message queues and/or deployments with limited storage capacity. Indeed, employing the one or more embodiments described herein, issues of retaining data for longer than needed and/or truncating data that has not yet been consumed can be avoided. Further, such issues can be avoided for plural readers that subscribe to and/or otherwise use a data stream. That is, the consumption-based truncation employed by the one or more embodiments described herein can account for individual rates of consumption of users, sometimes within limits approved by the users themselves or by a group controller of a group comprising the users.

Furthermore, existing techniques of truncation according to time of storage and/or storage space occupied can be maintained as supplementary processes and/or can be employed as limits in addition to one or more truncation techniques based on consumption. In one or more embodiments, truncation according to consumption can be accomplished without acknowledgement by the one or more systems, computer-implemented methods and/or non-transitory machine-readable mediums of individual ones of events having been appended to a stream.

Indeed, in view of the one or more embodiments, a practical application of the space reclamation systems described herein can be employment of user-specified checkpoints submitted relative to a lengthy data stream, such as comprising one or more specified cut positions relative to the stream. The checkpoints can be supplied based on consumption by a user of a data stream and/or by a group of one or more users of the data stream. The checkpoints can be employed to truncate the data stream relative to one or more rates of consumption by one or more users. In one example, as one real-world result, storage space can be reclaimed, thus allowing for publishing of new events and/or data to the data stream and/or to other data streams of a respective stream storage system.

Moreover, it will be appreciated that a space reclamation system described herein can be implemented in one or more domains to enable scaled stream truncations. For example, the space reclamation system can facilitate a process to execute two or more truncations in parallel at a single data stream. Likewise, the space reclamation system can facilitate one or more truncations of one or more data streams in parallel.

The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

It is to be appreciated that one or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of non-monolithic architectures, such as cloud native and/or microservice architectures and cannot be equally practicably implemented in a sensible way outside of a computing environment.

It also is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively truncate digitally stored data in the time that one or more embodiments described herein can facilitate this process. And, neither can the human mind nor a human with pen and paper electronically truncate digitally stored data as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 17:
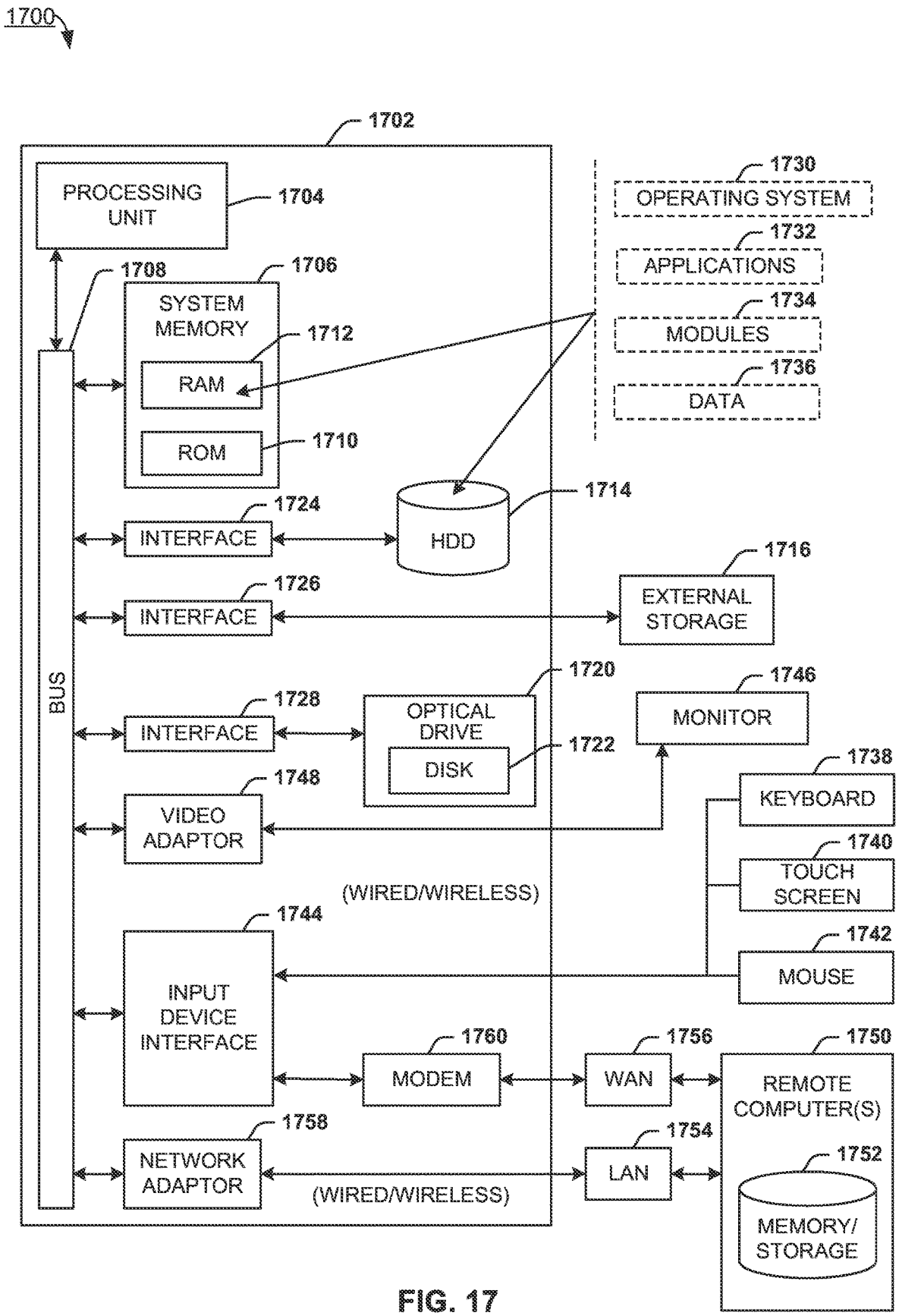
FIG. 17 illustrates an example block diagram of a computer operable to execute one or more embodiments described herein.

To provide additional context for various embodiments described herein, FIG. 17 and the following discussion are intended to provide a brief, general description of a suitable computing environment 1700 in which the various embodiments of the embodiment described herein can be implemented.

For example, parts of computing environment 1700 can be used to implement one or more embodiments of storage reclamation system 102 of FIG. 1. In some examples, computing environment 1700 can implement one or more embodiments of the process flows of FIGS. 7 and 8 to facilitate a process to reclaim storage space relative to one or more data streams employing the storage space.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include machine-readable storage media, machine-readable storage media, and/or communications media, which two terms are used herein differently from one another as follows. Machine-readable storage media or machine-readable storage media can be any available storage media that can be accessed by the computer and includes both volatile and nonvolatile media, removable and non-removable media. By way of example, and not limitation, machine-readable storage media or machine-readable storage media can be implemented in connection with any method or technology for storage of information such as machine-readable or machine-readable instructions, program modules, structured data or unstructured data.

Machine-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or machine-readable media, are to be understood to exclude only propagating transitory signals per se as modifiers and do not relinquish rights to all standard storage, memory or machine-readable media that are not only propagating transitory signals per se.

Machine-readable storage media can be accessed by one or more local or remote computing devices, e.g., via access requests, queries or other data retrieval protocols, for a variety of operations with respect to the information stored by the medium.

Communications media typically embody machine-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a nonvolatile storage such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Processing unit 1704 can comprise one or more types of processors and/or electronic circuitry (e.g., a classical processor, a quantum processor and/or like processor) that can implement one or more computer and/or machine readable, writable and/or executable components and/or instructions that can be stored at memory 1706. For example, processing unit 1704 can perform one or more operations that can be specified by computer and/or machine readable, writable and/or executable components and/or instructions including, but not limited to, logic, control, input/output (I/O), arithmetic and/or the like. In one or more embodiments, processing unit 1704 can be any of one or more commercially available processors. In one or more embodiments, processing unit 1704 can comprise one or more central processing unit, multi-core processor, microprocessor, dual microprocessors, microcontroller, System on a Chip (SOC), array processor, vector processor, quantum processor and/or another type of processor. The examples of processing unit 1704 can be employed to implement one or more embodiments described herein.

It will be appreciated that one or more aspects of the system memory 1706 or processing unit 1704 can be applied to memories such as 106 and/or respectively to processors such as 104, respectively of the non-limiting system architecture 100. It also will be appreciated that the system memory 1706 can be implemented in combination with and/or alternatively to memories such as 106. Likewise, it also will be appreciated that the processing unit 1704 can be implemented in combination with and/or alternatively to processors such as 104.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated machine-readable storage media provide nonvolatile storage of data, data structures, computer-executable instructions, and so forth. For the computer 1702, the drives and storage media accommodate the storage of any data in a suitable digital format. Although the description of machine-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enable with a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or machine-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any machine-readable device or machine-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining posting or non-posting of one or more checkpoints to a stream of a storage system, the one or more checkpoints being from one or more readers of a set of readers of events that have thus far been appended to a stream of a stream storage system;
      in response to the one or more checkpoints being posted relative to the stream, truncating the stream based on the checkpoints representing cut positions of the stream; and
      in response to non-posting of one or more checkpoints to the stream, truncating the stream based on a time quantity, a space quantity or a combination thereof,
      wherein the time quantity represents a quantity of time along the stream to retain, to truncate, or a combination thereof, and
      wherein the space quantity represents a quantity of space along the stream to retain, to truncate, or a combination thereof.

2. The system of claim 1, wherein the operations further comprise:
   automatically posting one or more of the one or more checkpoints in response to determining that one or more grouped readers of a group of the one or more readers of the set of readers have consumed the stream beyond a specified checkpoint at the stream, wherein the specified checkpoint is common to each of the one or more grouped readers.

3. The system of claim 1, wherein the operations further comprise:
  storing, at a lookup table, most recent ones of the one or more checkpoints.

4. The system of claim 1, wherein the operations further comprise:
  determining a subscriber lower bound of the one or more checkpoints of the stream.

5. The system of claim 4, wherein the truncating the stream further comprises:
  determining, regarding the subscriber lower bound, whether truncating the stream at the subscriber lower bound retains the time quantity or the space quantity of the stream, within a determined threshold range of the stream storage system for time or space along the stream and downstream from the subscriber lower bound.

6. The system of claim 4, wherein the truncating the stream further comprises:
  truncating, at an identified checkpoint of the one or more checkpoints of the stream, wherein the identified checkpoint is located along the stream upstream or downstream to a position of the subscriber lower bound along the stream.

7. The system of claim 1, wherein the operations further comprise:
  identifying timestamp information for the events appended to the stream thus far; and
  aligning the one or more checkpoints based on the timestamp information.

8. A non-transitory machine-readable medium, comprising executable instructions that, when executed by a processor, facilitate performance of operations, comprising:
  truncating a stream of a stream storage system based on one or more checkpoints applicable to a stream of a storage system and being from one or more readers of events appended to the stream thus far, wherein a subscriber lower bound is determined from the one or more checkpoints, and wherein the truncating comprises:
    determining, regarding the subscriber lower bound, whether truncating the stream at the subscriber lower bound retains a time quantity or a space quantity of the stream within a determined threshold range of the stream storage system for time or space along the stream.

9. The non-transitory machine-readable medium of claim 8,
  wherein the time quantity is based on time occupied on a time axis along which the stream is measured at the stream storage system.

10. The non-transitory machine-readable medium of claim 8,
  wherein the space quantity is based on space occupied by storage of the stream at the stream storage system.

11. The non-transitory machine-readable medium of claim 8,
  wherein the truncating further comprises truncating the stream at a first one of the one or more checkpoints, and
  wherein the truncating further comprises truncating at a second one of the one or more checkpoints of the stream that is upstream or downstream to the subscriber lower bound along the stream, in response to a determination that truncation of the stream at the subscriber lower bound would retain the time quantity or the space quantity being not within the determined threshold range of the stream storage system.

12. The non-transitory machine-readable medium of claim 8, wherein the truncating further comprises:
  truncating at a second checkpoint of the one or more checkpoints of the stream, other than at a first checkpoint representing the subscriber lower bound, wherein the second checkpoint is upstream to the subscriber lower bound, and wherein the truncating at the second checkpoint is executed in response to a first determination that such truncation at the subscriber lower bound would retain the time quantity or the space quantity of the stream after truncation that is less than a determined lower quantity limit of the stream storage system for time or space, respectively; or
  truncating at a second checkpoint of the one or more checkpoints of the stream, other than at the first checkpoint representing the subscriber lower bound, wherein the second checkpoint is upstream to the subscriber lower bound, and wherein the truncating at the second checkpoint is executed in response to a second determination that such truncation at the subscriber lower bound would retain the time quantity or the space quantity of the stream after truncation that is greater than a determined upper quantity limit of the stream storage system for time or space, respectively.

13. The non-transitory machine-readable medium of claim 8, wherein the truncating further comprises:
  deleting, by the truncating, a portion of the stream that is unconsumed by one or more of the one or more readers, the truncating being in response to the stream storage system comprising one or more determined thresholds for the time quantity or of the space quantity of the stream, wherein the one or more determined thresholds have been approved by the one or more readers.

14. The non-transitory machine-readable medium of claim 8, wherein the truncating further comprises:
  truncating, at a second checkpoint of the one or more checkpoints of the stream, other than the at a first checkpoint representing a subscriber lower bound, wherein the second checkpoint is downstream to the subscriber lower bound, in response to the subscriber lower bound overlapping a determined lower quantity limit of the stream storage system for time or space; or
  truncating at a second checkpoint one of the one or more checkpoints of the stream, other than the first checkpoint representing the subscriber lower bound, wherein the second checkpoint is upstream to the subscriber lower bound, in response to the subscriber lower bound overlapping a determined upper quantity limit of the stream storage system for time or space.

15. A method, comprising:
  determining posting or non-posting of one or more checkpoints to a stream of a storage system, the one or more checkpoints being from one or more readers of a set of readers of events thus far appended to a stream of a stream storage system;
  in response to the one or more checkpoints being posted to the stream, truncating the stream based on the one or more checkpoints, while adhering to one or more lower or upper quantity limits for a time quantity representing a quantity of time along the stream or for a space quantity representing a quantity of space along the stream; and
  in response to no checkpoints being posted to the stream, truncating the stream according only to the one or more lower or upper quantity limits of the stream.

16. The method of claim 15, further comprising:
storing, at a lookup table, most recent ones of the one or more checkpoints from the readers of the events; and
deleting, from the lookup table one or more of the one or more checkpoints in response to truncating the stream.

17. The method of claim 15, further comprising:
deleting, by the truncating, a portion of the stream that is unconsumed by one or more of the one or more readers, the truncating being in response to the stream storage system comprising one or more determined thresholds for the time quantity or of the space quantity of the stream, wherein the one or more determined thresholds have been approved by the one or more readers.

18. The method of claim 15, further comprising:
determining a subscriber lower bound represented by one or more of the one or more checkpoints of the stream.

19. The method of claim 18, wherein the truncating the stream further comprises:
truncating the stream at the subscriber lower bound in response to a determination that such truncation leaves the quantity of time occupied by the remaining stream that is within a determined time threshold range, wherein the time is measured along a time axis along which the stream was written at the stream storage system.

20. The method of claim 18, wherein the truncating the stream further comprises:
truncating the stream at the subscriber lower bound in response to a determination that such truncation leaves the quantity of space occupied by storage of the stream at the stream storage system that is within a determined space threshold range.

* * * * *